United States Patent
Yamada et al.

(10) Patent No.: US 9,394,921 B2
(45) Date of Patent: Jul. 19, 2016

(54) EJECTOR

(71) Applicant: DENSO CORPORATION, Kariya, Aichi-pref. (JP)

(72) Inventors: Etsuhisa Yamada, Kariya (JP); Haruyuki Nishijima, Obu (JP); Tatsuhiro Suzuki, Kariya (JP); Yoshiaki Takano, Kosai (JP); Hideya Matsui, Kariya (JP); Yoshiyuki Yokoyama, Obu (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 183 days.

(21) Appl. No.: 14/373,862

(22) PCT Filed: Jan. 29, 2013

(86) PCT No.: PCT/JP2013/000453
§ 371 (c)(1),
(2) Date: Jul. 22, 2014

(87) PCT Pub. No.: WO2013/114856
PCT Pub. Date: Aug. 8, 2013

(65) Prior Publication Data
US 2015/0033790 A1    Feb. 5, 2015

(30) Foreign Application Priority Data

Feb. 2, 2012 (JP) ................ 2012-020882
Aug. 24, 2012 (JP) ................ 2012-184950

(51) Int. Cl.
*F04F 5/46*     (2006.01)
*F25B 41/00*    (2006.01)
(Continued)

(52) U.S. Cl.
CPC . *F04F 5/463* (2013.01); *F04F 5/46* (2013.01); *F04F 5/462* (2013.01); *F04F 5/50* (2013.01);
(Continued)

(58) Field of Classification Search
CPC ............ F04F 5/463; F04F 5/50; F04F 5/462; F04F 5/46; F25B 39/028; F25B 41/00; F25B 2341/0014; F25B 2500/18; F25B 2400/23; F25B 2341/0012
See application file for complete search history.

(56) References Cited

U.S. PATENT DOCUMENTS

| 5,343,711 A | 9/1994 | Kornhauser et al. |
| 2001/0025499 A1 | 10/2001 | Takeuchi et al. |

(Continued)

FOREIGN PATENT DOCUMENTS

| JP | 432670 B1 | 1/1968 |
| JP | 59123700 U | 8/1984 |

(Continued)

OTHER PUBLICATIONS

International Search Report and Written Opinion (in Japanese with English Translation) for PCT/JP2013/000453, mailed May 7, 2013; ISA/JP.

*Primary Examiner* — Emmanuel Duke
(74) *Attorney, Agent, or Firm* — Harness, Dickey & Pierce, P.L.C.

(57) ABSTRACT

An ejector includes a body member having a depressurizing space that depressurizes a refrigerant which flows out of a swirling space that swirls the refrigerant, a suction passage that draws the refrigerant from an external, and a pressurizing space that mixes a refrigerant jetted from the depressurizing space with a refrigerant drawn from the suction passage and pressurizes the mixed refrigerant, and a conical passage formation member arranged in the depressurizing space and in the pressurizing space. A nozzle passage is formed of a refrigerant passage between an inner peripheral surface of the depressurizing space and an outer peripheral surface of the passage formation member, and a diffuser passage is formed of a refrigerant passage between an inner peripheral surface of a portion that defines the pressurizing space and an outer peripheral surface of the passage formation member.

13 Claims, 9 Drawing Sheets

(51) Int. Cl.
  *F04F 5/50*   (2006.01)
  *F25B 39/02*  (2006.01)

(52) U.S. Cl.
  CPC ............... *F25B 39/028* (2013.01); *F25B 41/00* (2013.01); *F25B 2341/0012* (2013.01); *F25B 2341/0014* (2013.01); *F25B 2400/23* (2013.01); *F25B 2500/18* (2013.01)

(56) References Cited

U.S. PATENT DOCUMENTS

| | | | |
|---|---|---|---|
| 2002/0000095 A1 | 1/2002 | Takeuchi et al. | |
| 2008/0000263 A1* | 1/2008 | Oomura | F25B 39/028 62/525 |
| 2010/0175422 A1 | 7/2010 | Yamada et al. | |

FOREIGN PATENT DOCUMENTS

| | | | | |
|---|---|---|---|---|
| JP | S6176800 | A | | 4/1986 |
| JP | H01250000 | A | | 10/1989 |
| JP | H11257299 | A | | 9/1999 |
| JP | 3322263 | B1 | | 9/2002 |
| JP | 3331604 | B2 | | 10/2002 |
| JP | 2002333000 | A | | 11/2002 |
| JP | 2003014318 | A | | 1/2003 |
| JP | 2003336915 | A | | 11/2003 |
| JP | 2006170051 | A | * | 6/2006 |
| JP | 2008008599 | A | | 1/2008 |
| JP | 2008202812 | A | * | 9/2008 |
| JP | 2008202812 | A | | 9/2008 |
| JP | 2008232458 | A | | 10/2008 |
| JP | 2009144607 | A | | 7/2009 |
| JP | 2010181136 | A | | 8/2010 |
| JP | 2010210111 | A | | 9/2010 |

* cited by examiner

EJECTOR

CROSS REFERENCE TO RELATED APPLICATIONS

This application is a U.S. National Phase Application under 35 U.S.C. 371 of International Application No. PCT/JP2013/000453 filed on Jan. 29, 2013 and published in Japanese as WO 2013/114856 A1 on Aug. 8, 2013. This application is based on Japanese Patent Applications No. 2012-020882 filed on Feb. 2, 2012, and No. 2012-184950 filed on Aug. 24, 2012. The entire disclosures of all of the above applications are incorporated herein by reference.

TECHNICAL FIELD

The present disclosure relates to an ejector that is a momentum transport pump that depressurizes a fluid and performs fluid transport by suction action of a working fluid ejected at high speed.

BACKGROUND ART

Some of conventional ejectors disclosed in, for example, Patent Documents 1 and 2 have been known. The ejector of this type includes a nozzle part that depressurizes a refrigerant condensed and liquefied by a refrigerant condenser after compressed to a high pressure by a compressor when the ejector is used in a refrigeration cycle, a suction part that draws a lower-pressure-side refrigerant flowing out of a refrigerant evaporator, and a diffuser part that mixes the refrigerant jetted from the nozzle part with the refrigerant drawn from the suction part and increases a pressure of the mixture.

Further, the nozzle part of the ejector in Patent Document 1 includes a first nozzle that depressurizes and expands a liquid refrigerant which flows therein from the refrigerant condenser, and a second nozzle that again depressurizes and expands the refrigerant that has been put into two phases of gas-liquid by the first nozzle, and ejects the refrigerant. With the above configuration, the refrigerant is expanded into the two phases of gas-liquid by the first nozzle, and further depressurized and expanded by the second nozzle. As a result, an exit velocity of the refrigerant that flows out of the second nozzle can be increased, and nozzle efficiency can be improved.

Also, in the general ejector, a diffuser part (pressurizing part) is coaxially arranged on an extension in an axial direction of the nozzle part. Further, Patent Document 2 discloses that a spread angle of the diffuser part thus arranged is relatively reduced so that ejector efficiency can be improved. The nozzle efficiency means energy conversion efficiency when a pressure energy of the refrigerant is converted into a kinetic energy in the nozzle part. The ejector efficiency means energy conversion efficiency as the overall ejector.

However, in the ejector of Patent Document 1, for example, when a refrigerant pressure difference between a high pressure side and a low pressure side is small in a low load of the refrigeration cycle, most of the refrigerant pressure difference is depressurized by the first nozzle, and the refrigerant can be hardly depressurized in the second nozzle. As a result, in the low load of the refrigeration cycle, the refrigerant may not be sufficiently pressurized in the diffuser part. That is, in the ejector of Patent Document 1, the sufficient operation of the ejector which matches the load of the refrigeration cycle may not be obtained.

On the contrary, when the diffuser part having the relatively small spread angle disclosed in Patent Document 2 may be applied to the ejector of Patent Document 1, to thereby improve the ejector efficiency and pressurize the refrigerant sufficiently in the diffuser part in the low load of the refrigeration cycle. However, when the diffuser part of this type is applied, a length of the nozzle part in the axial direction becomes longer as a whole of the ejector, resulting in a risk that a body of the ejector becomes unnecessarily longer in the normal load of the refrigeration cycle.

PRIOR ART DOCUMENT

Patent Document

Patent Document 1: Japanese Patent No. 3331604
Patent Document 2: JP 2003-14318 A

SUMMARY OF THE INVENTION

In consideration of the above-described points, it is a first objective of the present disclosure to provide an ejector capable of achieving a high nozzle efficiency regardless of a load variation of a refrigeration cycle without upsizing the body.

Also, it is a second objective of the present disclosure to provide an ejector capable of improving the nozzle efficiency and performing operation matching the load of the refrigeration cycle.

According to a first aspect of the present disclosure, an ejector is used for a vapor compression refrigeration cycle, and the ejector includes a body member including: a refrigerant inflow port through which a refrigerant is introduced; a swirling space in which the refrigerant introduced from the refrigerant inflow port swirls; a depressurizing space in which the refrigerant flowing out of the swirling space is depressurized; a suction passage communicating with a downstream side of the depressurizing space in a refrigerant flow and being a passage through which a refrigerant is drawn from an external; and a pressurizing space in which the refrigerant jetted from the depressurizing space and the refrigerant drawn through the suction passage are mixed and pressurized. The ejector further includes a passage formation member having at least a portion arranged in the depressurizing space and a portion arranged in the pressurizing space, a nozzle passage provided in a space between an inner peripheral surface of a portion of the body member which defines the depressurizing space and an outer peripheral surface of the passage formation member, the nozzle passage functioning as a nozzle part that depressurizes and jets the refrigerant flowing out of the swirling space, and a diffuser passage provided in a space between an inner peripheral surface of a portion of the body member which defines the pressurizing space and an outer peripheral surface of the passage formation member, the diffuser passage functioning as a diffuser part that mixes the jetted refrigerant with the drawn refrigerant and pressurizes the mixed refrigerant. The passage formation member has a shape that increases in cross-sectional area with distance from the depressurizing space.

According to the above configuration, the refrigerant is swirled within the swirling space, with the results that the refrigerant pressure on the swirling center side within the swirling space can be reduced to a pressure of a saturated liquid-phase refrigerant or to a pressure at which the refrigerant boils by depressurization boiling (i.e. cavitation is generated). Hence, the refrigerant having the reduced pressure can be made to flow into the depressurizing space.

Therefore, even if a load of the refrigeration cycle is varied, the refrigerant can be surely depressurized and boiled in the vicinity of the smallest passage area portion in the nozzle passage, and an energy conversion efficiency (corresponding to a nozzle efficiency) in the nozzle passage can be improved.

Further, since the passage formation member is shaped so that the sectional area thereof increases with distance from the depressurizing space, the diffuser passage can be shaped to expand along an outer periphery of the passage formation member with distance from the depressurizing space. Therefore, the enlargement of a dimension of the nozzle part in a direction corresponding to an axial direction thereof can be limited, and upsizing of the body of the overall ejector can be restricted.

That is, according to the first aspect of the present disclosure, the ejector that can exert the high nozzle efficiency without upsizing the body regardless of the load variation of the refrigeration cycle.

The passage formation member is not limited to one having only the shape in which the sectional area increases with distance from the depressurizing space. At least a part of the passage formation member may include a shape expanding outward with distance from the depressurizing space, and the diffuser passage has a shape expanding outward with distance from the depressurizing space according to the shape of the passage formation member.

According to a second aspect of the present disclosure, the passage formation member may have a conical shape that increases in cross-sectional area with distance from the depressurizing space. The nozzle passage, the suction passage and the diffuser passage each may have an annular shape in cross-section perpendicular to an axial direction of the passage formation member.

According to the above configuration, since the cross-sectional shapes of the nozzle passage, the suction passage, and the diffuser passage are annularly formed, those passages can be formed into a shape in which the refrigerant flows from the radially outer side to the radially inner side with respect to the axis of the passage formation member, or a shape in which the refrigerant flows from the radially inner side to the radially outer side. Therefore, a passage layout that effectively utilizes the internal space of the body member can be achieved, and the upsizing of the body of the overall ejector can be further restricted.

According to a third aspect of the present disclosure, the passage formation member may have a conical shape that increases in cross-sectional area with distance from the depressurizing space. The diffuser passage may have an annular shape in cross-section perpendicular to an axial direction of the passage formation member. The refrigerant flowing through the diffuser passage may swirl in the same direction as the refrigerant swirling in the swirling space.

According to the above configuration, the sectional shape of the diffuser passage is annularly formed, and the refrigerant flowing through the diffuser passage flows while swirling. Thus, the flow channel for pressurizing the refrigerant can be spirally formed. Therefore, the enlargement of the passage formation member in the axial direction can be limited, and the upsizing of the body of the overall ejector can be further restricted.

According to a fourth aspect of the present disclosure, the ejector may include a driving part that displaces the passage formation member. The passage formation member may have a conical shape that increases in cross-sectional area with distance from the depressurizing space, and the suction passage and the diffuser passage each may have an annular shape in a cross-section perpendicular to an axial direction of the passage formation member. The suction passage may have a shape in which the refrigerant flows from a radially outer side to a radially inner side with respect to an axis of the passage formation member. The diffuser passage may have a shape in which the refrigerant flows from the radially inner side to the radially outer side with respect to the axis of the passage formation member. The suction passage and the diffuser passage may be disposed along an outer periphery of the driving part, and at least a part of the driving part may be disposed between the suction passage and the diffuser passage in the axial direction of the passage formation member.

According to the above configuration, since the driving part is provided, the passage formation member can be displaced according to the load variation of the refrigeration cycle, and the refrigerant passage areas of the nozzle passage and the diffuser passage can be adjusted. Therefore, the ejector can be provided, in which the amount of refrigerant matching the load of the refrigeration cycle can be made to flow therein, and the operation matching the load of the refrigeration cycle can be performed.

Also, since at least a part of the driving part may be arranged at a position sandwiched between the suction passage and the diffuser passage, a space formed between the suction passage and the diffuser passage can be effectively utilized. As a result, the upsizing of the body of the overall ejector can be further restricted.

The "formed into a conical shape" in the above claim is not limited to means that the passage formation member is formed into a complete conical shape, but also includes meaning a shape close to cone or a shape partially including the conical shape. Specifically, the cross-sectional shape taken along the axial direction is not limited to an isosceles triangle, but includes a shape in which two sides between which a vertex is sandwiched are convexed on a radially inner side, a shape in which the two sides are convexed on a radially outer side, and a shape in which the cross-sectional shape is semicircular.

According to a fifth aspect of the present disclosure, the driving part may have a sealed space in which a temperature sensitive medium that changes in pressure depending on temperature change is enclosed, and a pressure responsive member that is displaced in accordance with the pressure of the temperature sensitive medium in the sealed space. The pressure responsive member may be connected to the passage formation member. The temperature sensitive medium may change in pressure by a temperature transmitted from the refrigerant flowing through the suction passage and a temperature transmitted from the refrigerant flowing through the diffuser passage.

According to the above configuration, the sealed space configuring the driving part is arranged at a position sandwiched between the suction passage and the diffuser passage. Hence, the temperature of the refrigerant flowing through the suction passage and the temperature of the refrigerant flowing through the diffuser passage can be excellently transmitted to the temperature sensitive medium, and a pressure within the sealed space can be changed accordingly.

The passage formation member is displaced according to the temperature of the refrigerant flowing through the suction passage and the temperature of the refrigerant flowing through the diffuser passage so that the refrigerant passage areas of the nozzle passage and the diffuser passage can be changed. As a result, the ejector that enables the operation matching the load of the refrigeration cycle can be provided.

According to a sixth aspect of the present disclosure, the depressurizing space, the suction passage, the pressurizing space and the passage formation member may be each formed into a rotating body shape, and respective axial lines thereof may be arranged coaxially with each other.

According to the above configuration, since the depressurizing space, the suction passage, the pressurizing space, and the passage formation member each formed into the rotating body shape are coaxially arranged, the nozzle passage, the suction passage, and the diffuser passage annularly formed in the section perpendicular to the axial direction can be easily formed.

According to a seventh aspect of the present disclosure, the body member may have a gas-liquid separation space in which the refrigerant flowing out of the diffuser passage is separated into gas and liquid.

According to the above configuration, the gas and liquid of the refrigerant that flow out of the diffuser passage are separated in the gas-liquid separation space. Thus, a volume of the gas-liquid separation space can be reduced as compared with a case in which a gas-liquid separation device is arranged outside of the body member. That is, since the refrigerant that flows out of the diffuser passage and flows into the gas-liquid separation space has been already swirled, the effective gas-liquid separation can be performed by the action of a centrifugal force of the swirling flow. Therefore, the upsizing of the body of the ejector having a gas-liquid separation function can be restricted.

According to an eighth aspect of the present disclosure, an ejector is used for a vapor compression refrigeration cycle. The ejector includes: a nozzle part that depressurizes and expands a high-pressure refrigerant that flows from a high pressure side of the refrigeration cycle; a suction part that draws a low-pressure refrigerant lower in pressure than the high-pressure refrigerant by a suction force of the refrigerant jetted from the nozzle part; a diffuser part disposed on a downstream side of the nozzle part, the diffuser part having an internal flow channel in which a sectional area gradually increases toward the downstream side, the diffuser part decelerating and pressurizing a mixed refrigerant of the refrigerant jetted from the nozzle part and the low-pressure refrigerant drawn from the suction part; a swirling space arranged on an upstream side of the nozzle part, the swirling space allowing the high-pressure refrigerant to swirl therein so as to make an amount of gas-phase refrigerant larger on a radially inner side than on a radially outer side with respect to an imaginary swirling center line, and allowing the refrigerant in a gas-liquid multiphase state to flow into the nozzle part; and an area variable mechanism capable of changing flow channel areas of the nozzle part and the diffuser part.

According to the above configuration, the high-pressure refrigerant is swirling in the swirling space so that the amount of gas-phase refrigerant on the radially inner side with respect to the swirling center line is made larger than that on the radially outer side. In fact, a two-phase separation state in which the gas single phase is present in the vicinity of the swirling center line, and the liquid single phase is present around the gas single phase is obtained in the swirling flow channel. That is, the refrigerant pressure on the swirling center side is reduced to the pressure at which the refrigerant is depressurization-boiled (i.e. cavitation is generated).

The flow becomes a two-phase spray state in the vicinity of the minimum flow channel area portion of the nozzle part due to the promotion of boiling (gasification) of the liquid refrigerant in the "gas-liquid interface generated by the two-phase separation state", and is accelerated up to a two-phase sonic speed. Further, the refrigerant accelerated up to the two-phase sonic speed can continue an ideal two-phase spray state from the minimum flow channel area portion of the nozzle part toward the outlet of the divergent flow channel part, and can increase the flow rate of the refrigerant jetted at the outlet of the divergent flow channel part. As a result, the ejector efficiency can be improved with an improvement in the nozzle efficiency of the nozzle part.

Since the refrigerant is depressurized and expanded by the nozzle part of not two-stage nozzles but one nozzle, the pressurizing energy by the diffuser part can be obtained by utilizing all of the pressure energy of the liquid-phase refrigerant that flows into the ejector.

Also, since the area variable mechanism that can change the flow channel areas of the nozzle part and the diffuser part is provided, the flow channel areas are changed according to the load of the refrigeration cycle so that the amount of refrigerant matching the load of the refrigeration cycle can flow therein, and the effective operation of the ejector can be derived.

According to a ninth aspect of the present disclosure, the high-pressure refrigerant may be a liquid-phase refrigerant.

According to the above configuration, if the high-pressure refrigerant is the liquid-phase refrigerant, a two-phase separation state in which the gas single phase is present in the vicinity of the swirling center line, and the liquid single phase is present around the gas single phase is obtained in the swirling flow channel of the refrigerant as described above. Therefore, the flow from the minimum flow channel area portion of the nozzle part toward the outlet of the divergent flow channel part becomes the two-phase spray state due to the promotion of boiling (gasification) of the liquid refrigerant on the "gas-liquid interface generated in the two-phase separation state". Hence, the effects of an increase in the refrigerant flow rate at the outlet of the divergent flow channel part are surely obtained. The effects are larger than those when the high-pressure refrigerant is the two phases of gas-liquid.

According to a tenth aspect of the present disclosure, the area variable mechanism may be capable of changing the flow channel areas of the nozzle part and the diffuser part simultaneously.

According to the above configuration, when the flow channel area is changed, the flow channel areas of the nozzle part and the diffuser part are changed simultaneously. Therefore, the flow of refrigerant flowing through the nozzle part and the diffuser part is not disturbed. Moreover, the members for changing the flow channel areas of the nozzle part and the diffuser part can be formed of one member, and the configuration of the area variable mechanism can be simplified.

According to an eleventh aspect of the present disclosure, an increasing rate of a cross-sectional area of the internal flow cannel of the diffuser part may be set to be gradually larger toward the downstream side. The area variable mechanism may include a passage formation member having a curved surface along inner peripheral surfaces of the nozzle part and the diffuser part. The internal flow channel of the diffuser part may be disposed along an outer peripheral surface of the passage formation member and expands in a direction intersecting with an axial direction of the diffuser part.

According to the above configuration, the downsized ejector that can reduce a length of the diffuser part in the axial direction can be realized.

Also, the high-pressure refrigerant swirled by the swirling space is maintained in the swirling state even in the nozzle part and the diffuser part, and flows out in the direction intersecting with the axial direction of the diffuser part. Hence, the mixed refrigerant that flows out of the diffuser part is subjected to the action of centrifugal separation by the swirling flow, and the liquid-phase refrigerant larger in density flows to a side farther from the axial line than the gas-phase refrigerant smaller in density. That is, the ejector per se can be provided with the effective gas-liquid separation function.

According to a twelfth aspect of the present disclosure, the ejector may include a gas-liquid separator separating the mixed refrigerant flowing out of the diffuser part into gas and liquid.

According to the above configuration, the downsized ejector formed integrally with the gas-liquid separator can be realized. In this case, the swirling flow of the refrigerant in the swirling space is maintained even in the nozzle part and the diffuser part. For that reason, the mixed refrigerant that flows out of the diffuser part is subjected to the action of centrifugal separation by the swirling flow, and the liquid-phase refrigerant larger in density flows to a side farther from the axial line than the gas-phase refrigerant smaller in density.

Therefore, with the provision of the gas-liquid separator that separates gas and liquid of the mixed refrigerant that flows out of the diffuser part, the refrigerant separated into gas and liquid by the diffuser part can rapidly flow into the gas-liquid separator, and the effective gas-liquid separation can be performed.

According to a thirteenth aspect of the present disclosure, the ejector may include a liquid storage part that accumulates the refrigerant separated into gas and liquid by the gas-liquid separator therein. The liquid storage part may be formed integrally with the gas-liquid separator.

According to the above configuration, the downsized ejector provided integrally with the gas-liquid separator and the liquid storage part can be realized. Also, with the integration of the liquid storage part with the gas-liquid separator, the refrigerant separated into gas and liquid by the gas-liquid separator can be effectively accumulated in the liquid storage part.

EMBODIMENTS FOR EXPLOITATION OF THE INVENTION

Figure 1:
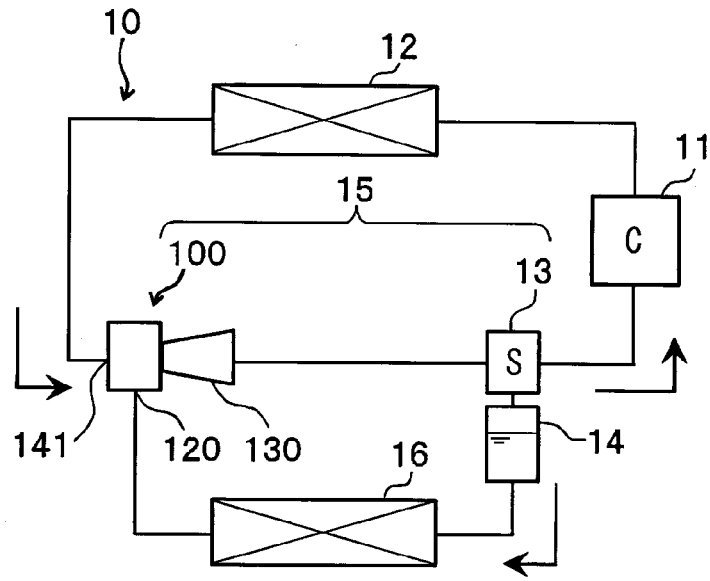
FIG. 1 is a schematic diagram illustrating a refrigeration cycle according to a first embodiment.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

Figure 2:
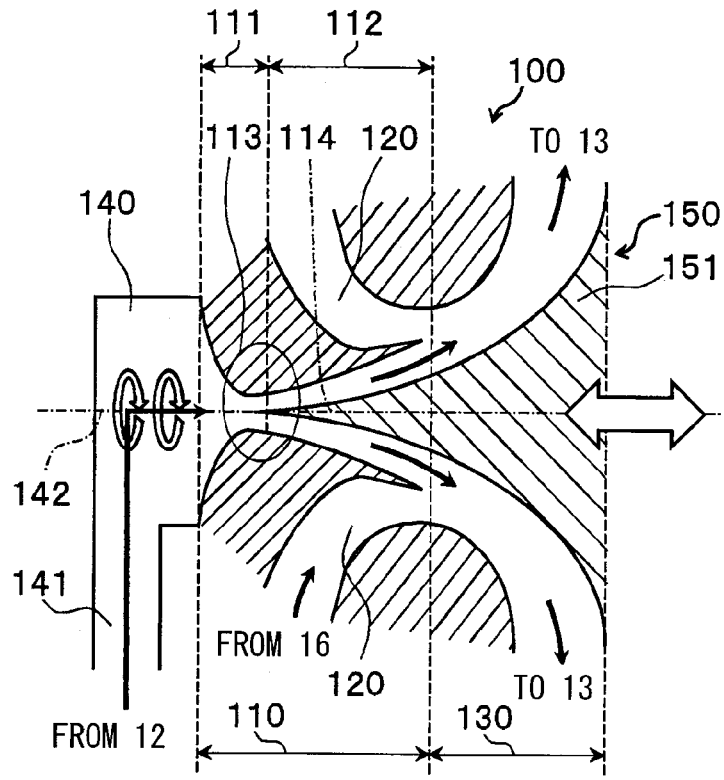
FIG. 2 is a schematic cross-sectional diagram illustrating an ejector.

FIGS. 1 and 2 illustrate an example in which an ejector 100 of a first embodiment is used for a vapor compression refrigeration cycle (hereinafter referred to as "refrigeration cycle") 10. The refrigeration cycle 10 is disposed in a vehicle as an air conditioner, in which a compressor 11, a condenser 12, an ejector 100, a gas-liquid separator 13, a liquid storage part 14, and an evaporator 16 are connected by refrigerant piping.

The operation of the compressor 11 is controlled by a control device not shown. The compressor 11 is a fluid machine that draws a gas-phase refrigerant from inside the gas-liquid separator 13, compresses the gas-phase refrigerant to a high temperature and a high pressure, and discharges the gas-phase refrigerant to the condenser 12. The compressor 11 is rotationally driven by a vehicular travel engine through an electromagnetic clutch and a belt which are not shown. The compressor 11 is, for example, a swash plate type variable capacity compressor having a discharge capacity varied by a control signal inputted from the control device to an electromagnetic capacity control valve. The compressor 11 may be an electric compressor rotationally driven by an electric motor. In the electric compressor, the discharge capacity is varied by the number of rotations of the electric motor.

The condenser 12 is a heat exchanger that performs heat exchange between a high-pressure refrigerant discharged from the compressor 11 and a vehicle exterior air (hereinafter referred to as "outside air") forcedly blown by a non-shown cooling fan, thereby discharging a heat of a high-pressure refrigerant to the outside air (i.e. cooling the high-pressure refrigerant) to condense and liquefy the refrigerant. If the pressure of the refrigerant compressed by the compressor 11 exceeds a critical pressure, the refrigerant is not condensed and liquefied even if being cooled. In this case, the condenser 12 functions as a heat radiator that cools the high-pressure refrigerant. A refrigerant outflow side of the condenser 12 is connected to an inflow part 141 (to be described in detail later) of the ejector 100.

The ejector 100 serves as a depressurizing device that depressurizes a liquid-phase refrigerant (high-pressure refrigerant) flowing out of the condenser 12, and also as a refrigerant circulating device for fluid transport which circulates the refrigerant by using a drawing action (attracting action) of a refrigerant flow ejected at a high speed. As illustrated in FIG. 2, the ejector 100 includes a nozzle part 110, a suction part 120, a diffuser part 130, a swirling space 140, and an area variable mechanism 150.

The nozzle part 110 takes in the liquid-phase refrigerant, flowing out of the condenser 12, through the swirling space 140 described later. Since a passage area of the nozzle part 110 narrows toward a downstream side of the refrigerant flow, the refrigerant is depressurized and expanded isentropically by converting a pressure energy of the refrigerant into a velocity energy. The nozzle part 110 includes a convergent portion 111 having a flow channel converged toward a downstream side, and a divergent portion 112 arranged downstream of the convergent portion 111 and having the flow channel diverged toward the downstream side. A portion in which the convergent portion 111 and the divergent portion 112 are connected to each other forms a nozzle throat portion (smallest passage area portion) 113 in which the flow channel area is most reduced. An imaginary axial line of the nozzle part 110 along the refrigerant flow direction is defined as an axial line 114.

The suction part 120 is a flow channel formed in a direction intersecting with the nozzle part 110, and arranged to communicate with a refrigerant ejection port (outlet of the divergent portion 112) of the nozzle part 110 from the external of the ejector 100. A refrigerant inlet side of the suction part 120 is connected to a refrigerant outlet side of the evaporator 16.

The diffuser part 130 mixes the high-speed refrigerant (ejected refrigerant) which is ejected from the nozzle part 110 with the gas-phase refrigerant (drawn refrigerant) drawn from the suction part 120 (evaporator 16) on a downstream side of the nozzle part 110 and the suction part 120. The diffuser part 130 decelerates a flow of the mixed refrigerant to pressurize the mixed refrigerant via conversion of the velocity energy to the pressure energy.

The diffuser part 130 is formed into a shape (so-called diffuser shape) in which a cross-sectional area of a refrigerant flow channel gradually increases toward the downstream side to provide the above-mentioned pressurizing function. An increasing rate of the cross-sectional area of the flow channel of the diffuser part 130 is set to gradually increase toward the downstream side. For example, the diffuser part 130 has a trumpet shape. The refrigerant outlet side of the diffuser part 130 is connected with the gas-liquid separator 13.

The swirling space 140 is a flow channel that is arranged on the upstream side of the nozzle part 110, and swirls the liquid-phase refrigerant flowing out of the condenser 12. The swirling space 140 allows the gas-phase refrigerant to be present on a radially inner side more than on a radially outer side with respect to an imaginary center line (hereinafter referred to as "swirling center line") of the swirling flow, thereby making the refrigerant in a gas-liquid multiphase state flow into the nozzle part 110. The swirling space 140 is formed by, for example, a flat cylindrical space. The swirling space 140 is equipped with a pipe-shaped inflow part 141 that is connected with a cylindrical outer periphery of the swirling space 140 in its tangential direction. The inflow part 141 communicates with an interior of the swirling space 140.

When the cylindrical imaginary axial line of the swirling space 140 is defined as an axial line 142, the swirling space 140 is arranged relative to the nozzle part 110 so that the axial line 142 is parallel to the imaginary axial line 114 of the nozzle part, and more specifically so that the axial line 142 matches the axial line 114. The swirling space 140 is connected to the nozzle part 110 so as to communicate with the nozzle part 110. The refrigerant inlet side of the inflow part 141 is connected with the refrigerant outlet side of the condenser 12.

In order that a larger amount of gas-phase refrigerant is present on the radially inner side with respect to the swirling center line in the swirling space 140, the swirling flow rate of the refrigerant needs to sufficiently be increased. To achieve this configuration, a ratio A of the cross-sectional area of the flow channel of the inflow part 141 to the cross-sectional area of the flow channel of the nozzle throat portion 113, and a ratio B of the cross-sectional area of the flow channel of the swirling space 140 to the cross-sectional area of the flow channel of the nozzle throat portion 113 are each set to a predetermined value.

The area variable mechanism 150 is a mechanical part that changes the flow channel areas of the nozzle part 110 and the diffuser part 130. The area variable mechanism 150 includes a passage formation member 151, and a non-shown driving part which drives the passage formation member 151. The passage formation member 151 is formed into a conical shape and has a curved surface along inner peripheral surfaces of the divergent portion 112 and the diffuser part 130 as an outer peripheral surface of the passage formation member 151. A tip side of the passage formation member 151 is arranged to face the nozzle part 110, and inserted into the divergent portion 112 and the diffuser part 130.

In other words, at least a part of the passage formation member 151 is arranged within a space (depressurizing space) that configures the nozzle part 110, and within a space (pressurizing space) that configures the diffuser part 130. Also, a gap is formed between the outer peripheral surface of the passage formation member 151 and the inner peripheral surfaces of the divergent portion 112 and the diffuser part 130. This gap is formed as internal flow channels of the nozzle part 110 (divergent portion 112) and the diffuser part 130.

That is, a refrigerant passage between the inner peripheral surface of the space (depressurizing space) that configures the nozzle part 110 and the outer peripheral surface of the passage formation member 151 configures the internal flow channel (nozzle passage) functioning as the nozzle part that depressurizes and jets the refrigerant. A refrigerant passage between the inner peripheral surface of the space (pressurizing space) that configures the diffuser part 130 and the outer peripheral surface of the passage formation member 151 configures an internal flow channel (diffuser passage) functioning as the diffuser part that mixes the jetted refrigerant with the drawn refrigerant and pressurizes the mixed refrigerant.

Further, the diffuser part 130 is formed into a trumpet shape as described above, and the passage formation member 151 is formed to have a curved surface along the inner peripheral surface of the diffuser part 130. Therefore, the internal flow passage of the diffuser part 130 is formed to expand in a direction intersecting with the axial direction of the diffuser part 130. That is, the internal flow channel of the diffuser part 130 extends in the axial direction on its upstream side and continuously further extends in a centrifugal direction on its downstream side. The extending direction of the downstream side of the internal flow channel of the diffuser part 130 is not limited to a centrifugal direction completely perpendicular to the axial line.

The driving part slides the passage formation member 151 in the direction of the axial line 114, and includes a temperature sensitive part, an actuating bar, and an elastic member. The temperature sensitive part expands or contracts in volume within a pressure chamber partitioned by, for example, a diaphragm in accordance with a temperature and a pressure of the liquid-phase refrigerant supplied from the condenser 12 to the ejector 100 through the inflow part 141, or in accordance with a temperature and a pressure of the gas-phase refrigerant supplied from the evaporator 16 to the ejector 100 through the suction part 120.

The actuating bar is a rod-like member arranged in parallel to the axial line 114, and has one end side connected to the diaphragm, and the other end side connected to the passage formation member 151. The actuating bar moves in a direction parallel to the axial line 114 in accordance with the expansion and contraction of the temperature sensitive part (diaphragm), and slides the passage formation member 151 in the direction parallel to the axial line 114. The elastic member is arranged to urge the passage formation member 151 from its opposite side from the actuating bar, and a spring is, for example, used for the elastic member.

Therefore, when the temperature and the pressure of the refrigerant supplied to the ejector 100 rise, the temperature sensitive part expands. In this case, when an expansion force overcomes an urging force of the elastic member, the temperature sensitive part makes the actuating bar move. With this operation, the passage formation member 151 moves to make the gap between the nozzle part 110 and the passage formation member 151 and the gap between the diffuser part 130 and the passage formation member 151 become larger, and the areas of the flow channels of the nozzle part 110 and the diffuser part 130 become larger accordingly.

On the contrary, when the temperature and the pressure of the refrigerant supplied to the ejector 100 decrease, the temperature sensitive part contracts. The passage formation member 151 moves to make the gap between the nozzle part 110 and the passage formation member 151 and the gap between the diffuser part 130 and the passage formation member 151 become smaller due to the urging force of the elastic member. The areas of the flow channels of the nozzle part 110 and the diffuser part 130 become smaller. Since the passage formation member 151 is formed by a single member relative to the nozzle part 110 and the diffuser part 130, the areas of the flow channels of the nozzle part 110 and the diffuser part 130 are changed simultaneously.

Returning to FIG. 1, the gas-liquid separator 13 is a gas-liquid separator that separates the mixed refrigerant flowing out of the diffuser part 130 of the ejector 100 into the two phases: gas and liquid. The above-described ejector 100 and the gas-liquid separator 13 can be expressed such that the ejector 100 and the gas-liquid separator 13 configure a power recovery device 15 that recovers a loss of a kinetic energy when the refrigerant is depressurized by the nozzle part 110, and increases the pressure of the refrigerant drawn into the compressor 11 by converting the recovered kinetic energy into the pressure energy.

The gas-liquid separator 13 is connected to the compressor 11 and the liquid storage part 14. The gas-phase refrigerant of the gas-liquid two phase refrigerant separated by the gas-liquid separator 13 is drawn into the compressor 11. The liquid-phase refrigerant of the gas-liquid two phase refrigerant separated by the gas-liquid separator 13 flows into the liquid storage part 14.

The liquid storage part 14 is a container body that stores therein the liquid-phase refrigerant of the gas-liquid two phase refrigerant separated by the gas-liquid separator 13. For example, a cylindrical flow channel is formed within the liquid storage part 14. The refrigerant outflow side of the liquid storage part 14 is connected to the refrigerant inflow side of the evaporator 16. The liquid storage part 14 is thus disposed between the gas-liquid separator 13 and the evaporator 16, in other words, the liquid storage part 14 is disposed at a lower pressure side of the refrigeration cycle 10.

The evaporator 16 is a heat exchanger through which the refrigerant flows, and the refrigerant is evaporated by heat absorbing actions of an outside air or a vehicle interior air (hereinafter referred to as "inside air"), which is introduced into an air conditioning case of the air conditioner by a blower. The refrigerant outflow side of the evaporator 16 is connected to the suction part 120 of the ejector 100 by refrigerant piping.

The non-shown control device includes a known microcomputer including a CPU, a ROM and a RAM, and peripheral circuits of the microcomputer. Various operation signals (air conditioning operation switch, temperature setting switch, etc.) are inputted to the control device from an operation panel (not shown) by a passenger, and detection signals are inputted to the control device from various sensor groups. The control device performs various calculations and processing on the basis of a control program stored within the ROM with the use of these input signals to control the operation of various devices (mainly, compressor 11).

Next, the operation of the present embodiment based on the above-mentioned configuration will be described.

When signals of the air conditioning operation switch and the temperature setting switch are inputted to the control device by the passenger, a control signal output from the control device causes an electromagnetic clutch of the compressor 11 to be energized to be in an engaged state, and a rotary drive force is transmitted to the compressor 11 from the vehicular travel engine. When the compressor 11 is an electric compressor, the electric motor operates, and the rotary drive force is transmitted to the compressor 11 from the electric motor.

When a control current In (control signal) is output to an electromagnetic capacity control valve of the compressor 11 from the control device on the basis of a control program, the discharge capacity of the compressor 11 is regulated, and the compressor 11 draws and compresses the gas-phase refrigerant from the gas-liquid separator 13 and discharges the refrigerant.

The gas-phase refrigerant with a high temperature and a high pressure, which has been compressed and discharged from the compressor 11, flows into the condenser 12. In the condenser 12, the refrigerant with the high temperature and the high pressure is cooled by the outside air, and condensed and liquefied. The liquid-phase refrigerant from the condenser 12 flows into the swirling space 140 through the inflow part 141 of the ejector 100.

Since the inflow part 141 is connected to the cylindrical outer periphery of the swirling space 140 in its tangential direction, the liquid-phase refrigerant that has flowed into the swirling space 140 makes a swirling flow that swirls with respect to the axial line 142 within the swirling space 140. In this case, the swirling center line substantially matches the axial line 142. In this swirling flow, the pressure in the vicinity of the swirling center line is reduced to a pressure at which the refrigerant is depressurizing-boiled (cavitation is generated) by the action of a centrifugal force. As a result, the refrigerant can be put into a two-phase separation state in which a gas single phase of the refrigerant is present in the vicinity of the swirling center line, and a liquid single phase of the refrigerant is present around the gas single phase of the refrigerant.

Since the axial line 142 of the swirling space 140 and the axial line 114 of the nozzle part 110 are arranged to match each other, the gas single phase and the liquid single phase of the refrigerant flow into the nozzle part 110 as the refrigerant in the gas-liquid multiphase state.

In the nozzle part 110, the refrigerant is depressurized and expanded. Since the pressure energy of the refrigerant is converted into the velocity energy in the depressurizing and expanding operation, the refrigerant of the gas-liquid multiphase state is ejected from the nozzle part 110 at a high speed. By a refrigerant drawing action of the ejected refrigerant, the liquid-phase refrigerant in the liquid storage part 14 is changed into a gas-phase refrigerant through the evaporator 16 and drawn into the suction part 120.

As described above, the refrigerant is put into the two-phase separation state in the swirling space 140, in which the gas single phase is present in the vicinity of the swirling center line, and the liquid single phase is present around the gas single phase. Since boiling (gasification) of the liquid refrigerant is promoted on the "gas-liquid interface generated in the two-phase separation state", the refrigerant flows from the convergent portion 111 of the nozzle part 110 to the outlet of the divergent portion 112 in a two-phase spray state. As a result, a flow rate of the refrigerant jetted from the outlet of the divergent portion 112 increases.

The refrigerant ejected from the nozzle part 110 and the refrigerant drawn into the suction part 120 are mixed and flow into the diffuser part 130 located on the downstream side of the nozzle part 110. In the diffuser part 130, the velocity energy of the refrigerant is converted into the pressure energy due to the passage area enlarged toward the downstream side, and accordingly the pressure of the refrigerant rises.

As described above, the flow rate of the refrigerant that passes through the nozzle part 110 and the diffuser part 130 is regulated by the area variable mechanism 150. That is, when the temperature and the pressure of the refrigerant (the liquid-phase refrigerant at high pressure or the gas-phase refrigerant at low pressure) which is supplied to the ejector 100 increase, the areas of the flow channels of the nozzle part 110 and the diffuser part 130 are varied to increase. Reversely, when the temperature and the pressure of the refrigerant which is supplied to the ejector 100 decrease, the areas of the flow channels of the nozzle part 110 and the diffuser part 130 are varied to decrease.

In other words, when the temperature and the pressure of the refrigerant are high, a load of the refrigeration cycle 10 is high, and the amount of refrigerant circulating in the refrigeration cycle 10 is increased by the increment of the area of the flow channel. Reversely, when the temperature and the pressure of the refrigerant are low, the load of the refrigeration cycle 10 is low, and the amount of refrigerant circulating in the refrigeration cycle 10 is decreased by the decrement of the area of the flow channel.

Then, the refrigerant that has flowed out of the diffuser part 130 flows into the gas-liquid separator 13. The gas-phase refrigerant of the gas-liquid two phase refrigerant separated by the gas-liquid separator 13 is drawn into the compressor 11, and compressed again. In this situation, since the pressure of the refrigerant drawn into the compressor 11 has been increased by the diffuser part 130 of the ejector 100, a driving power of the compressor 11 can be reduced.

Also, the liquid-phase refrigerant of the gas-liquid two phase refrigerant separated by the gas-liquid separator 13 flows into the liquid storage part 14, and flows into the evaporator 16 from the liquid storage part 14 due to the refrigerant drawing action of the ejector 100. In the evaporator 16, the liquid-phase refrigerant at low pressure absorbs heat from air (outside air or inside air) inside the air conditioning case, and is evaporation-gasified. That is, the air inside the air conditioning case is cooled. The gas-phase refrigerant that has passed through the evaporator 16 is drawn by the ejector 100, and flows out of the diffuser part 130.

As described above, in the present embodiment, since the swirling space 140 is disposed in the ejector 100, the liquid-phase refrigerant is swirled and put into the two-phase separation state in the swirling space 140, in which the gas single phase of the refrigerant is present in the vicinity of the swirling center line, and the liquid single phase of the refrigerant is present around the gas single phase. That is, the refrigerant pressure on the swirling center side decreases to a pressure at which the refrigerant is depressurization-boiled (i.e. cavitation is generated).

Since boiling (gasification) of the liquid refrigerant is promoted on the "gas-liquid interface generated in the two-phase separation state", the refrigerant flows from the convergent portion 111 (smallest flow channel area part) of the nozzle part 110 to the outlet of the divergent portion 112 (divergent flow channel part) in the two-phase spray state. As a result, a flow rate of the refrigerant jetted from the outlet of the divergent portion 112 increases. The efficiency (nozzle efficiency) of the nozzle part 110 of the ejector 100 is proportional to the speed of the ejected refrigerant, as a result of which the nozzle efficiency of the nozzle part 110 can be improved, and the ejector efficiency can be also improved.

Since the nozzle part 110 decompresses and expands the refrigerant by not two-stage nozzles but single nozzle, all of the pressure energy of the liquid-phase refrigerant that flows into the ejector 100 is utilized to obtain a pressurizing energy used in the diffuser part 130.

Since the area variable mechanism 150 that can change the areas of the flow channels of the nozzle part 110 and the diffuser part 130 is provided, the flow channel area can be changed according to the load of the refrigeration cycle 10. Moreover, the refrigerant can be made to flow in the refrigerant cycle 10 at a flow rate matching the load of the refrigeration cycle 10, and the effective operation of the ejector 100 can be derived.

The high-pressure refrigerant that flows into the ejector 100 (swirling space 140) is the liquid-phase refrigerant in the present embodiment. When the high-pressure refrigerant is the liquid-phase refrigerant, the refrigerant has the two-phase separation state in the swirling space 140, in which the gas single phase of the refrigerant is present in the vicinity of the swirling center line, and the liquid single phase of the refrigerant is present around the gas single phase, as described above.

Since boiling (gasification) of the liquid refrigerant is promoted on the "gas-liquid interface generated in the two-phase separation state", the refrigerant flows from the convergent portion 111 (smallest flow channel area part) of the nozzle part 110 to the outlet of the divergent portion 112 (divergent flow channel part) in the two-phase spray state. Hence, a flow rate of the refrigerant jetted from the outlet of the divergent portion 112 increases. As a result, the nozzle efficiency is more improved as compared with a case in which the high-pressure refrigerant is the gas-liquid two phases.

The area variable mechanism 150 is capable of changing the areas of the flow channels of the nozzle part 110 and the diffuser part 130 by the passage formation member 151 simultaneously. As a result, the flow of refrigerant flowing through the nozzle part 110 and the diffuser part 130 is not disturbed when changing the areas of the flow channels.

Also, members that change the areas of the flow channels of the nozzle part 110 and the diffuser part 130 can be formed by the single member (passage formation member 151), and the configuration of the area variable mechanism 150 can be simplified.

The internal flow channel of the diffuser part 130, which is defined by the passage formation member 151, is disposed to expand in a direction intersecting with the axial direction of the diffuser part 130. With this configuration, a length of the diffuser part 130 in the axial direction can be reduced to downsize the ejector 100.

The swirling state of the liquid-phase refrigerant in the swirling space 140 is maintained even in the nozzle part 110 and the diffuser part 130, and flows out of the diffuser part 130 in the direction intersecting with the axial direction of the diffuser part 130 together with the gas-phase refrigerant from the suction part 120. Hence, the mixed refrigerant that flows out of the diffuser part 130 is subjected to the action of centrifugal separation by the swirling flow, and the liquid-phase refrigerant larger in density flows out to a side farther from the axial line than the gas-phase refrigerant smaller in density. That is, the ejector 100 can be provided with the effective gas-liquid separation function.

(Second Embodiment)

Figure 3:
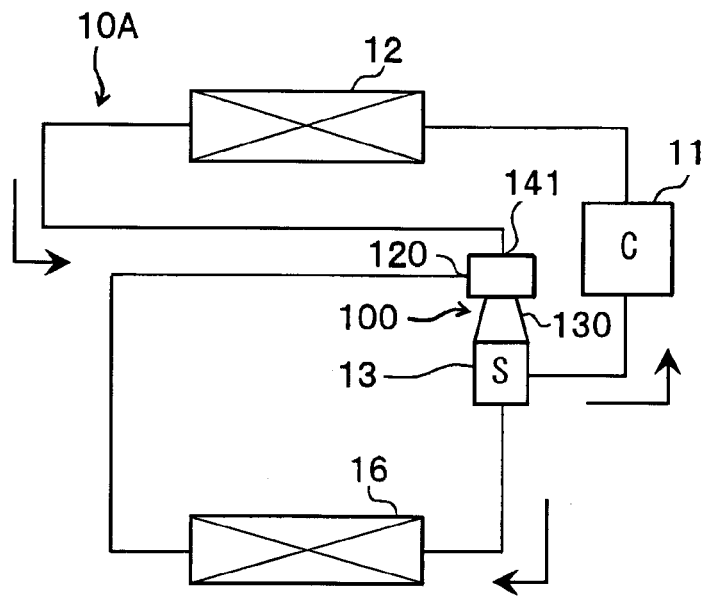
FIG. 3 is a schematic diagram illustrating a refrigeration cycle according to a second embodiment.
Figure 4:
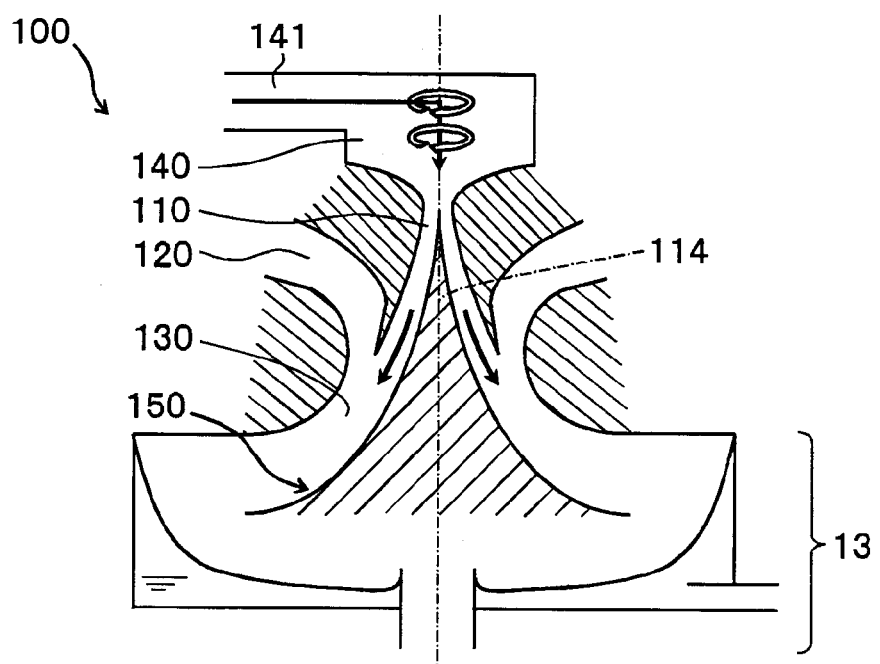
FIG. 4 is a cross-sectional diagram illustrating a power recovery device according to the second embodiment.

A refrigeration cycle 10A according to a second embodiment is illustrated in FIGS. 3 and 4. The refrigeration cycle 10A is configured so that an ejector 100 and a gas-liquid separator 13 are formed integrally with each other in the above first embodiment. Specifically, as illustrated in FIG. 4, the ejector 100 and the gas-liquid separator 13 in the present embodiment are formed integrally with each other in such a manner that the ejector 100 is arranged above the cylindrical gas-liquid separator 13.

In this case, an axial line 114 of a nozzle part 110 has the same direction as that of an axial line of the cylindrical shape of the gas-liquid separator 13. Further, a swirling space 140, the nozzle part 110, a diffuser part 130, and an area variable mechanism 150 are arranged from the top toward the bottom. A downstream side of the diffuser part 130 communicates with an upper interior of the gas-liquid separator 13.

A swirling state of the refrigerant swirled in the swirling space 140 is maintained even in the nozzle part 110 and the diffuser part 130, and flows out of the diffuser part 130. Hence, the mixed refrigerant that flows out of the diffuser part 130 is subjected to the action of centrifugal separation by the swirling flow, so that the gas-phase refrigerant smaller in density is collected on the center side of the swirling flow, and the liquid-phase refrigerant larger in density is collected on the radially outer side of the swirling flow. Thus, gas and liquid are separated from each other.

Hence, the ejector 100 is formed integrally with the gas-liquid separator 13, thereby being capable of realizing the downsized gas-liquid separator integrated ejector 100. Also, since the ejector 100 per se includes the gas-liquid separation function, the gas-liquid separated fluid can be made to quickly flow into the gas-liquid separator 13 by the ejector 100, and the effective gas-liquid separation can be performed.

(Third Embodiment)

Figure 5:
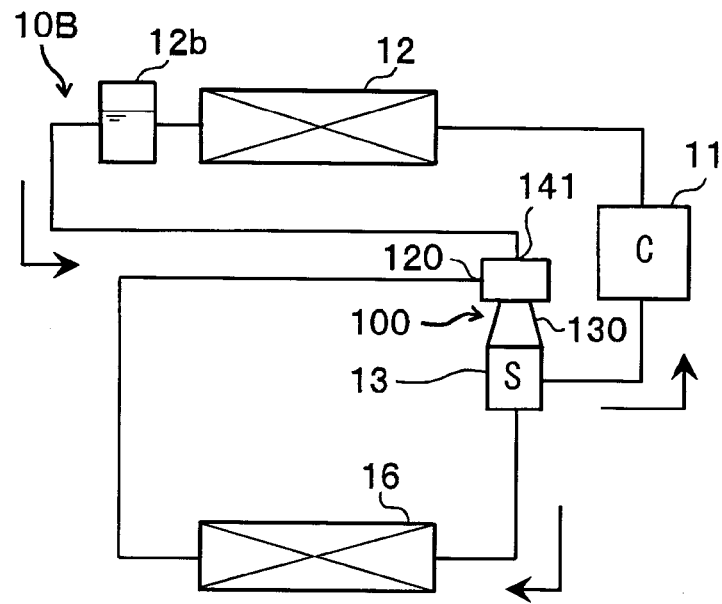
FIG. 5 is a schematic diagram illustrating a refrigeration cycle according to a third embodiment.

A refrigeration cycle 10B according to a third embodiment is illustrated in FIG. 5. In the present embodiment, a receiver (liquid receiving part) 12$b$ that stores the liquid-phase refrigerant that has flowed out of a condenser 12 is provided in addition to the above second embodiment. The liquid-phase refrigerant of the gas-liquid two phase refrigerant separated by a gas-liquid separator 13 flows directly into an evaporator 16.

The receiver 12$b$ is arranged on the refrigerant outflow side of the condenser 12, and accumulates therein the liquid-phase refrigerant that has flowed out of the condenser 12. Then, the liquid-phase refrigerant is supplied to an ejector 100 (inflow part 141) from the receiver 12$b$. With this configuration, the same advantages as those in the above second embodiment can be obtained.

(Fourth Embodiment)

Figure 6:
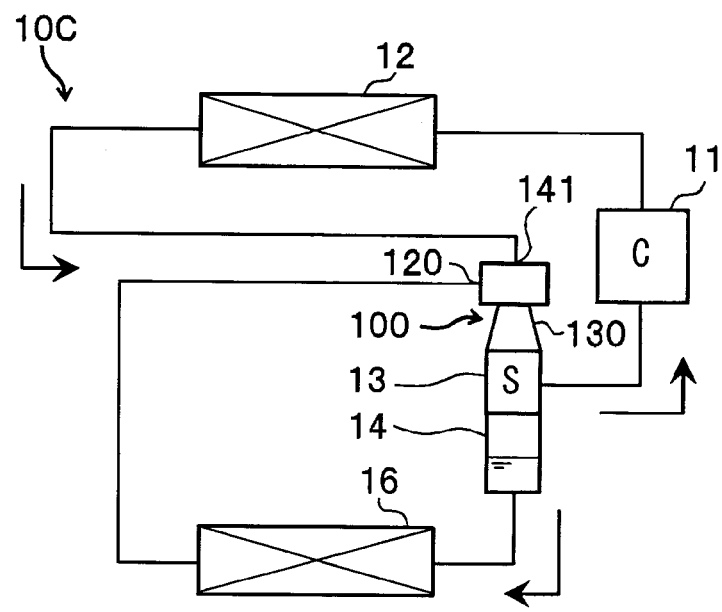
FIG. 6 is a schematic diagram illustrating a refrigeration cycle according to a fourth embodiment.
Figure 7:
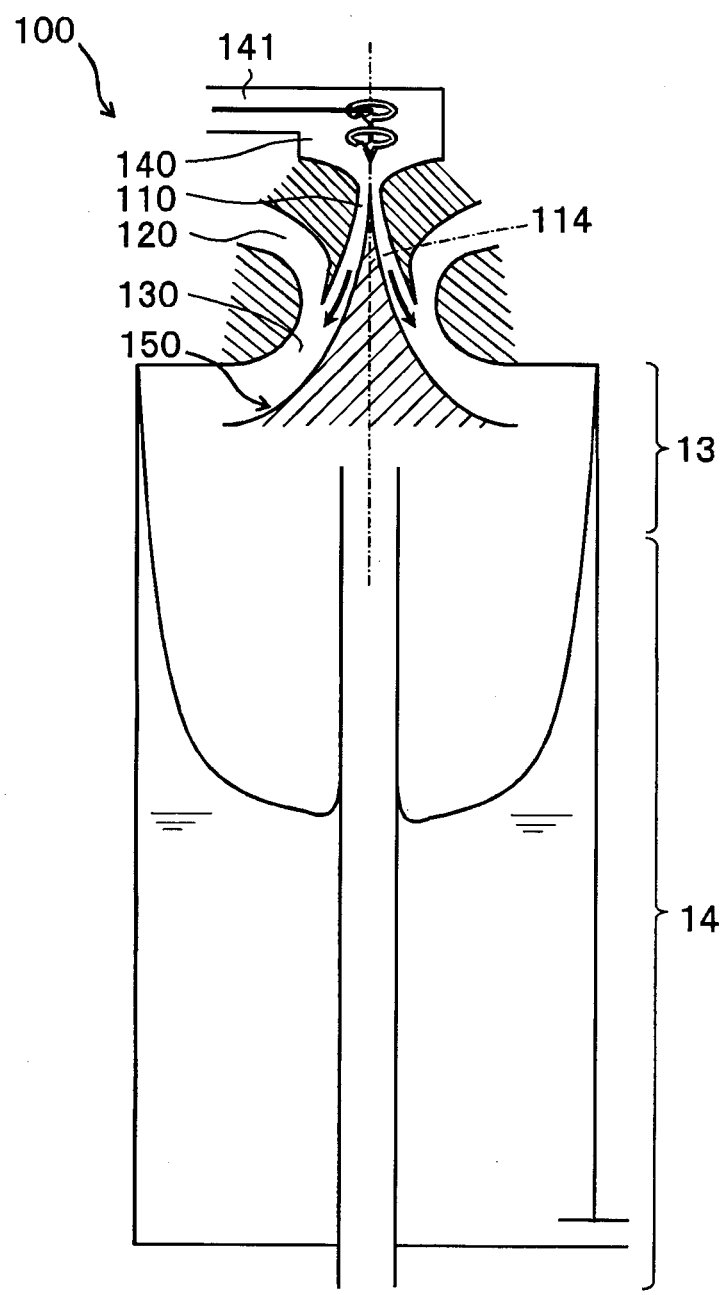
FIG. 7 is a schematic cross-sectional diagram illustrating a power recovery device according to the fourth embodiment.

A refrigeration cycle 10C according to a fourth embodiment is illustrated in FIGS. 6 and 7. The refrigeration cycle 10C is configured so that a liquid storage part 14 is further equipped integrally with an ejector 100 that is formed integrally with a gas-liquid separator 13 as in the second embodiment.

With the above configuration, the downsized ejector 100 provided integrally with the gas-liquid separator 13 and the liquid storage part 14 can be realized. Moreover, since the liquid storage part 14 is integrated with the gas-liquid separator 13, the refrigerant separated into gas and liquid by the gas-liquid separator 13 can be effectively accumulated in the liquid storage part 14.

(Fifth Embodiment)

Figure 8:
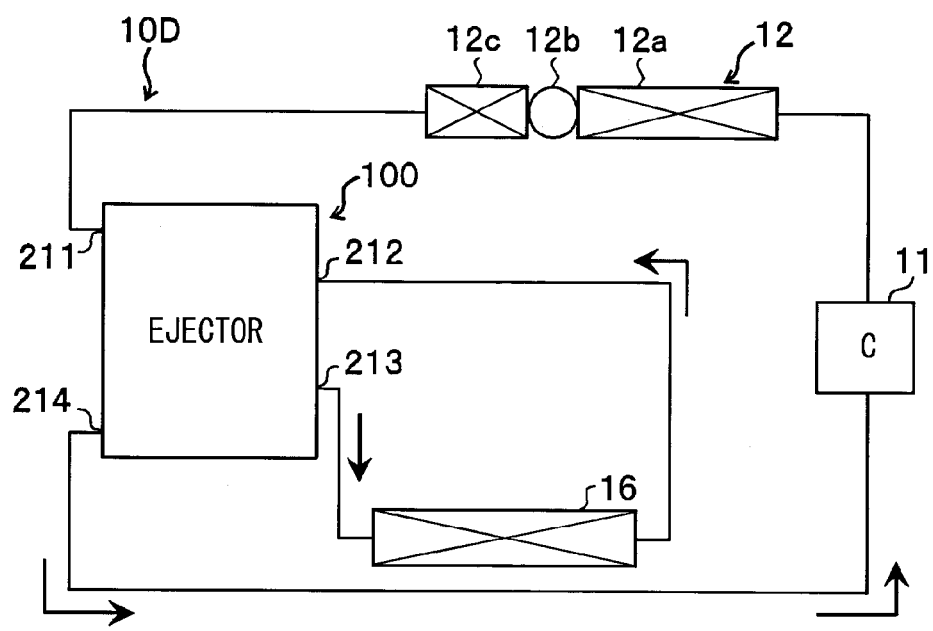
FIG. 8 is a schematic diagram illustrating a refrigeration cycle according to a fifth embodiment.

In the present embodiment, an example will be described, in which an ejector 100 provided integrally with a gas-liquid separator 13 and a liquid storage part 14 described in the fourth embodiment is applied to a refrigeration cycle 10D illustrated in FIG. 8 so as to provide a configuration specifically illustrated in a cross-sectional diagram of FIG. 9. In the refrigeration cycle 10D, a compressor 11, a condenser 12, the ejector 100, and an evaporator 16 are connected by refrigerant piping.

Further, the refrigeration cycle 10D employs, as the condenser 12, a so-called subcooling condenser including a condensing part 12$a$ that performs heat exchange between the high-pressure gas-phase refrigerant discharged from the compressor 11 and the outside air blown from the cooling fan to condense the high-pressure gas-phase refrigerant, a receiver 12$b$ that separates gas and liquid of the refrigerant that has flowed out of a condensing part 12$a$ and stores a surplus liquid-phase refrigerant therein, and a subcooling part 12$c$ that performs heat exchange between the liquid-phase refrigerant that has flowed out of the receiver 12$b$ and the outside air blown from the cooling fan to subcool the liquid-phase refrigerant.

The refrigeration cycle 10D employs an HFC based refrigerant (specifically, R134a) as the refrigerant, and configures a subcritical refrigeration cycle in which the high-pressure side refrigerant pressure does not exceed a critical pressure of the refrigerant. An HFO based refrigerant (specifically, R1234yf) may be employed as the refrigerant configuring the subcritical refrigeration cycle. Further, a refrigerant oil for lubricating the compressor 11 is mixed with the refrigerant, and a part of the refrigerant oil is circulated in the cycle together with the refrigerant.

Next, a specific configuration of the ejector 100 according to the present embodiment will be described with reference to FIGS. 9 to 13. Up and down arrows in FIG. 9 indicate respectively up and down directions in a state where the refrigeration cycle 10D is disposed in a vehicle. Also, FIG. 10 is a schematic cross-sectional diagram illustrating functions of the respective refrigerant passages of the ejector 100, which is a drawing corresponding to FIG. 2 of the first embodiment. The same parts as those in FIG. 2 are denoted by identical symbols.

Figure 9:
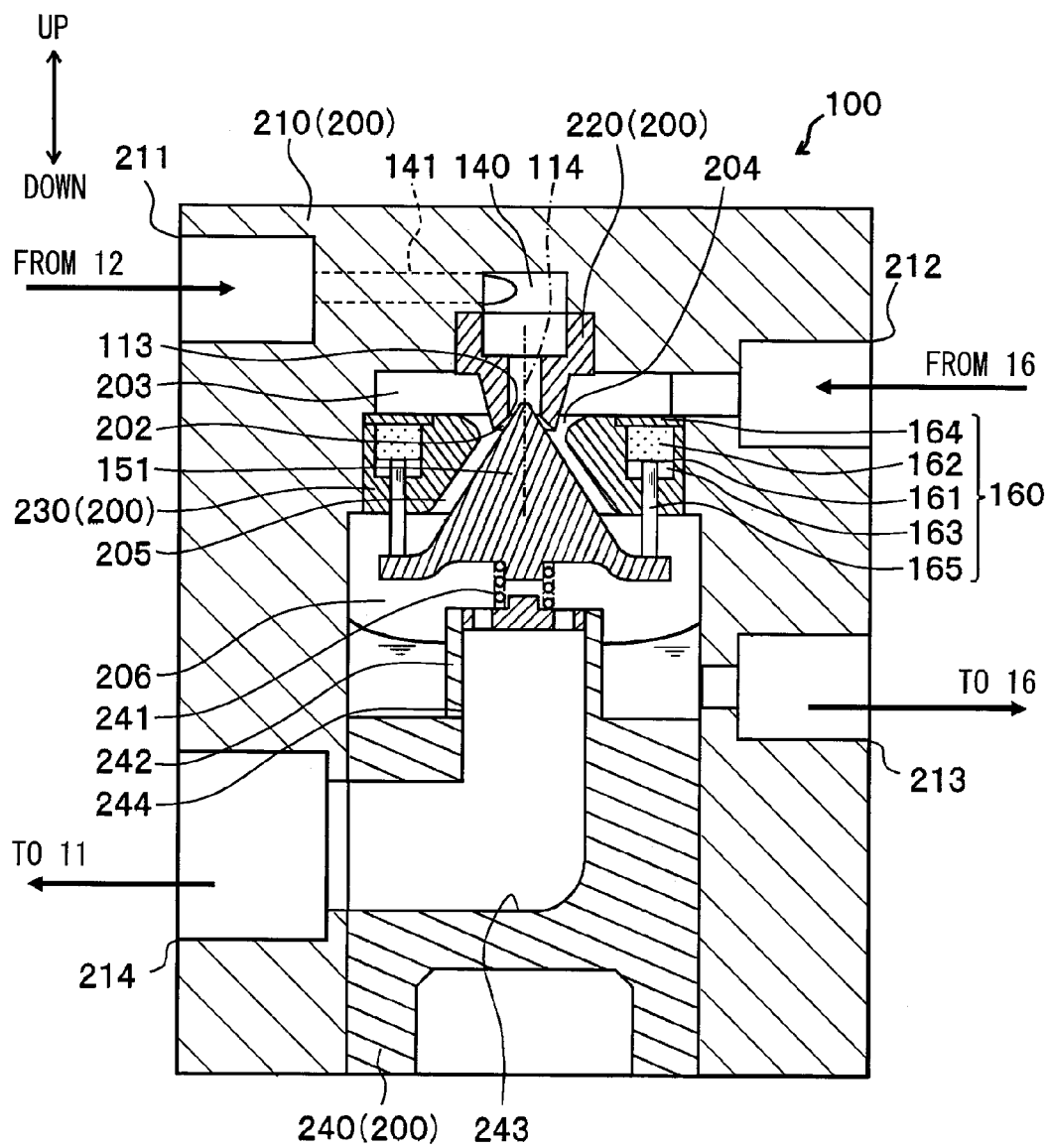
FIG. 9 is a schematic cross-sectional diagram of an ejector according to a fifth embodiment.
Figure 10:
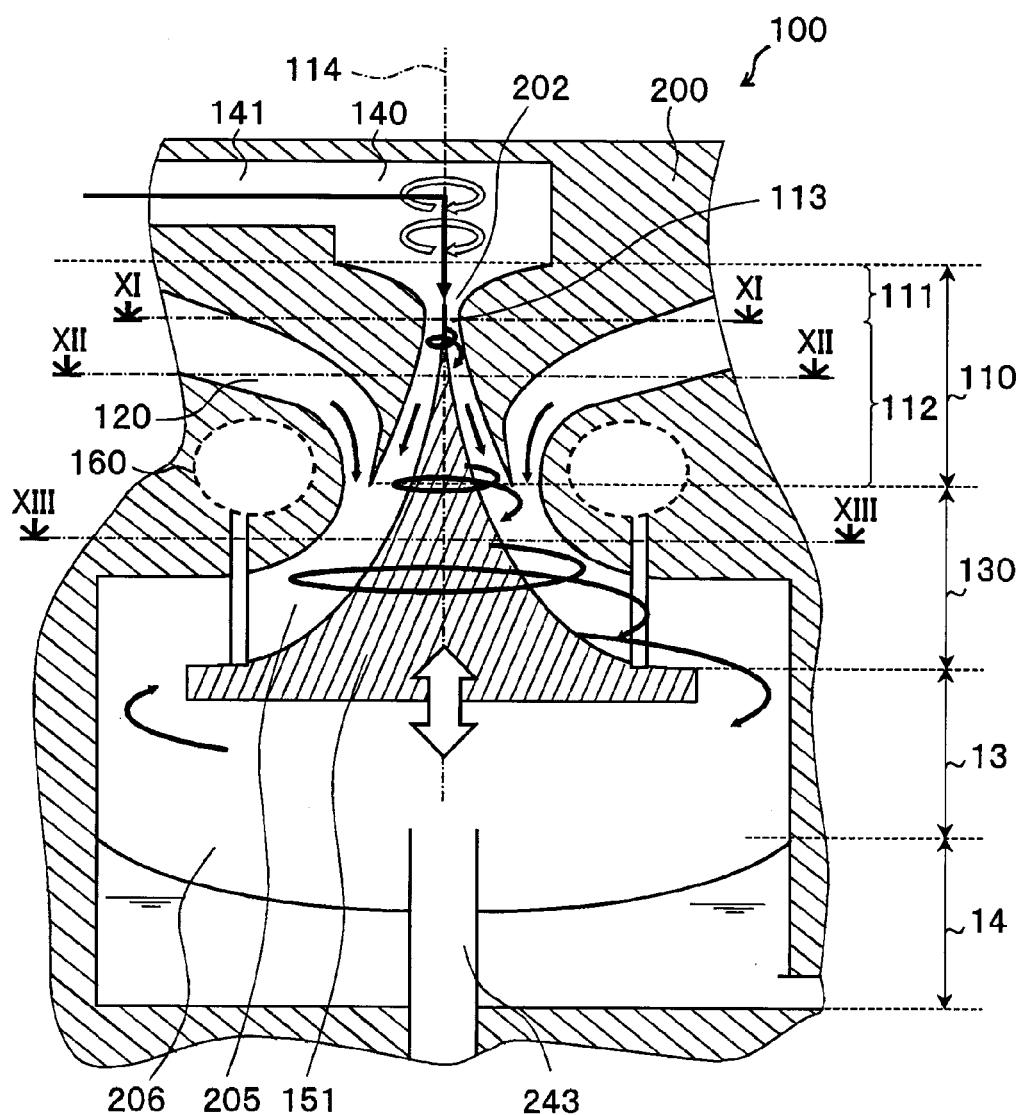
FIG. 10 is a schematic cross-sectional diagram illustrating functions of respective refrigerant passages of the ejector according to the fifth embodiment.

First, as illustrated in FIG. 9, the ejector 100 according to the present embodiment includes a body member 200 configured by the combination of a plurality of components. Specifically, the body member 200 has a housing body 210 made of prismatic-cylindrical or circular-cylindrical metal, and forming an outer shell of the ejector 100. A nozzle body 220, a middle body 230, and a lower body 240 are fixed to an interior of the housing body 210.

The housing body 210 is formed with a refrigerant inflow port 211 through which the refrigerant that has flowed out of the condenser 12 flows into the housing body 210, and a refrigerant suction port 212 through which the refrigerant that has flowed out of the evaporator 16 is drawn into the housing body 210. The housing body 210 is also formed with a liquid-phase refrigerant outflow port 213 through which a liquid-phase refrigerant separated by a gas-liquid separation space 206 formed in the body member 200 flows out to the refrigerant inlet side of the evaporator 16, and a gas-liquid refrigerant outflow port 214 through which the gas-phase refrigerant separated by the gas-liquid separation space 206 flows out to the suction side of the compressor 11.

The nozzle body 220 is formed of a substantially conically-shaped metal member that is tapered in a refrigerant flow direction. The nozzle body 220 is fixed to the interior of the housing body 210 by means such as press fitting so that an axial direction of the nozzle body 220 is parallel to a vertical direction (up-down direction in FIG. 9). A swirling space 140 in which the refrigerant that has inflowed through the refrigerant inflow port 211 is provided between an upper side of the nozzle body 220 and the housing body 210.

The swirling space 140 has a rotating body shape, and a center axis of the swirling space 140 extends in the vertical direction. The rotating body shape is a solid shape formed by rotating a plane figure around one straight line (center axis) coplanar with the plane figure. More specifically, the swirling space 140 according to the present embodiment is formed into a substantially cylindrical shape. The swirling space 140 may be formed into a shape having a circular cone or a circular truncated cone, coupled with a cylinder.

Further, the inflow part (refrigerant inflow passage) 141 that connects the refrigerant inflow port 211 and the swirling space 140 extends in a tangential direction of an inner wall surface of the swirling space 140 when viewed in a center axis direction of the swirling space 140. With this configuration, the refrigerant that has flowed into the swirling space 140 from the inflow part 141 flows along an inner wall surface of the swirling space 140, and swirls within the swirling space 140.

The inflow part 141 does not need to be formed to completely match the tangential direction of the swirling space 140 when viewed in the center axis direction of the swirling space 140. If the inflow part 141 includes at least a component in the tangential direction of the swirling space 140, the inflow part 141 may be formed to include components in the other directions (for example, components in the axial direction of the swirling space 140).

Since a centrifugal force acts on the refrigerant swirling within the swirling space 140, the refrigerant pressure on the center axis side becomes lower than the refrigerant pressure on the radially outer side within the swirling space 140. Under the circumstances, in the present embodiment, in the operation of the refrigeration cycle 10D, the refrigerant pressure on the center axis side within the swirling space 140 is reduced to a pressure of a saturated liquid-phase refrigerant, or a pressure at which the refrigerant is depressurization-boiled (i.e. cavitation is generated).

The regulation of the refrigerant pressure on the center axis side within the swirling space 140 can be realized by regulating the swirling flow rate of the refrigerant swirled within the swirling space 140 as described in the first embodiment. Further, the swirling flow rate can be regulated by, for example, regulating a ratio of the flow channel sectional area between the passage sectional area of the inflow part 141 and the sectional area of the swirling space 140 perpendicular to the axial direction. The swirling flow rate in the present embodiment means the flow rate of the refrigerant in the swirling direction in the vicinity of the outermost peripheral portion of the swirling space 140.

A depressurizing space 202 is provided within the nozzle body 220, and the refrigerant that has flowed out of the swirling space 140 is in the depressurized depressurizing space 202 and flows out of depressurizing space 202 to the downstream side. The depressurizing space 202 is formed into a rotating body shape having a cylindrical space coupled with a circular truncated conical space that gradually expands in a refrigerant flow direction continuously from a lower side of the cylindrical space. A center axis of the depressurizing space 202 is arranged coaxially with the center axis of the swirling space 140.

Further, a nozzle throat portion (smallest passage area portion) 113 most reduced in the refrigerant passage area within the depressurizing space 202 is formed, and a passage formation member 151 that changes the passage area of the nozzle throat portion 113 is arranged, within the depressurizing space 202. The passage formation member 151 is formed into a substantially conical shape gradually widened in a radial direction toward the downstream side of the refrigerant flow, and the center axis is arranged coaxially with the center axis of the depressurizing space 202. In other words, the passage formation member 151 is formed into a conical shape having a cross-sectional area that increases with distance from the depressurizing space 202.

The refrigerant passage formed between an inner peripheral surface of a portion of the nozzle body 220 which defines the depressurizing space 202 and an outer peripheral surface of the upper side of the passage formation member 151, as illustrated in FIG. 10, is configured by a convergent portion 111 and a divergent portion 112. The convergent portion 111 is formed upstream of the nozzle throat portion (smallest passage area portion) 113 in the refrigerant flow and has the refrigerant passage extending to the nozzle throat portion 113. The refrigerant passage of the convergent portion 111 has a passage area that gradually decreases to that of the nozzle throat portion 113. The divergent portion 112 is formed downstream of the nozzle throat portion 113 in the refrigerant flow and has the refrigerant passage extending from the nozzle throat portion 113. The refrigerant passage of the divergent portion 112 has a passage area that gradually increases from that of the nozzle throat portion 113.

Figure 11:
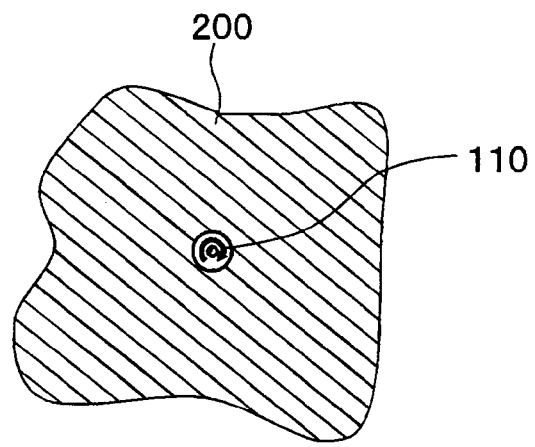
FIG. 11 is a cross-sectional diagram taken along a line XI-XI in FIG. 10.
Figure 12:
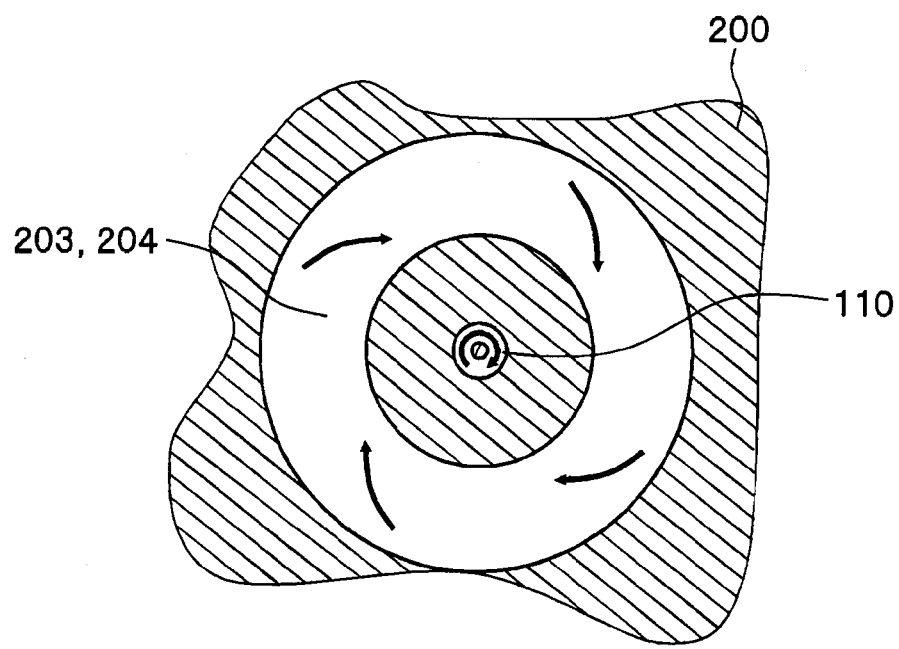
FIG. 12 is a cross-sectional diagram taken along a line XII-XII in FIG. 10.

In the divergent portion 112, since the depressurizing space 202 overlaps with the upper side of the passage formation member 151 when viewed in the radial direction of an axial line 114 (center axis of the passage formation member 151) of the nozzle part, a sectional shape perpendicular to the axial line 114 is annular (doughnut shape obtained by removing a smaller-diameter circular shape from a circular shape arranged coaxially with the smaller-diameter circular shape) as illustrated in a cross-sectional diagram of FIG. 11.

In the present embodiment, since the refrigerant passage between the inner peripheral surface of the portion of the nozzle body 220 which defines the depressurizing space 202 and the outer peripheral surface of the upper side of the passage formation member 151 has the above passage shape, the refrigerant passage is defined as a nozzle passage 110 (corresponding to the nozzle part 110 described in the above-mentioned embodiment) which functions as a nozzle. The flow rate of the refrigerant depressurized by the nozzle passage 110 is increased to the sonic speed. Further, in the nozzle passage 110, as indicated by heavy solid arrows in FIGS. 10 and 11, the refrigerant flows along the refrigerant passage annular in cross-section while swirling.

Next, as illustrated in FIG. 9, the middle body 230 is formed of a disc-shaped member made of metal that is provided with a through-hole of the rotating body shape which penetrates through both sides thereof in the center portion. The middle body 230 accommodates therein a driving part 160 on a radially outer side of the through-hole, and the driving part 160 displaces the passage formation member 151. A center axis of the through-hole is arranged coaxially with the center axes of the swirling space 140 and the depressurizing space 202. Also, the middle body 230 is fixed to the lower side of the nozzle body 220 within the housing body 210 by means such as press fitting.

Further, an inflow space 203 is formed between an upper surface of the middle body 230 and an inner wall surface of the housing body 210 facing the middle body 230, and the inflow space 203 accumulates the refrigerant that has flowed out of a refrigerant suction port 212. In the present embodiment, because a tapered tip of a lower end of the nozzle body 220 is located within the through-hole of the middle body 230, the inflow space 203 is formed into an annular shape in cross-section when viewed in the center axis direction (direction along the axial line 114 of the nozzle part 110) of the swirling space 140 and the depressurizing space 202.

The through-hole of the middle body 230 has a part in which a refrigerant passage sectional area is gradually reduced toward the refrigerant flow direction so as to match an outer peripheral shape of the tapered tip of the nozzle body 220 in an area where the lower side of the nozzle body 220 is inserted, that is, an area the middle body 230 and the nozzle body 220 overlap with each other when viewed in a radial direction.

Accordingly, a suction passage 204 is formed between an inner peripheral surface of the through-hole and an outer peripheral surface of the lower side of the nozzle body 220, and the inflow space 203 communicates with a downstream side of the depressurizing space 202 in the refrigerant flow through the suction passage 204. That is, in the present embodiment, the inflow space 203 and the suction passage 204 configures a suction part (suction passage) 120 through which the drawn refrigerant flows from the radially outer side toward the radially inner side with respect to the center axis. Further, the shape of the suction part (suction passage) 120 in cross section perpendicular to the center axis has an annular shape as illustrated in a cross-sectional diagram of FIG. 12.

Also, as illustrated in FIG. 9, a pressurizing space 205 formed into a substantially circular truncated conical shape that is gradually widened in the refrigerant flow direction is formed in the through-hole of the middle body 230 on the downstream side of the suction passage 204 in the refrigerant flow. The pressurizing space 205 is a space in which the refrigerant jetted from the above-mentioned nozzle passage 110 is mixed with the refrigerant drawn from the suction part 120 and the mixed refrigerant is pressurized.

The lower side of the above-mentioned passage formation member 151 is located in the pressurizing space 205. A spread angle of the conical-shaped side surface of the passage formation member 151 in the pressurizing space 205 is smaller than a spread angle of the circular truncated conical space of the pressurizing space 205. Therefore, the refrigerant passage area of the refrigerant passage is gradually enlarged toward the downstream side in the refrigerant flow.

In the present embodiment, the refrigerant passage area is enlarged as above. Thus, the refrigerant passage, which is formed between the inner peripheral surface of the middle body 230 and the outer peripheral surface of the lower side of the passage formation member 151 and configures the pressurizing space 205, is defined as a diffuser passage 130 (corresponding to the diffuser part 130 described in the above-mentioned embodiment) which functions as a diffuser. The diffuser passage 130 converts velocity energies of the jetted refrigerant and the drawn refrigerant into a pressure energy.

Figure 13:
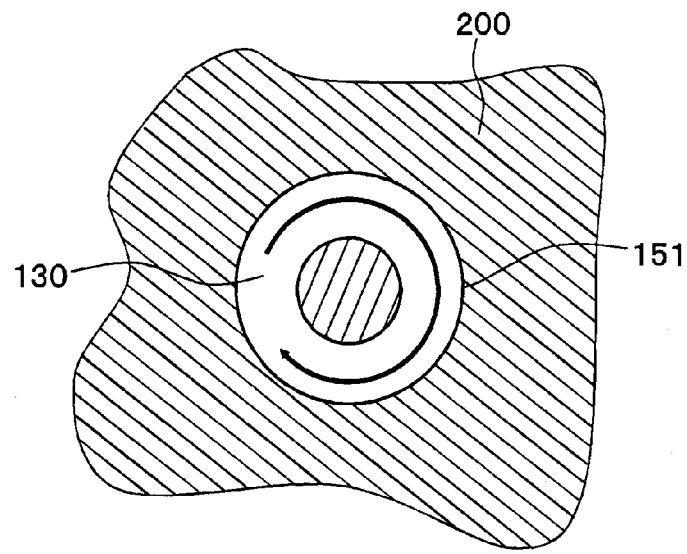
FIG. 13 is a cross-sectional diagram taken along a line XIII-XIII in FIG. 10.

Further, the shape of the diffuser passage 130 in cross section perpendicular to the center axis has an annular shape as illustrated in a cross-sectional diagram of FIG. 13. In the diffuser passage 130, as indicated by heavy solid arrows in FIGS. 10 and 13, the refrigerant is made to swirl along the refrigerant passage annular in cross-section by a velocity component of the refrigerant jetted from the refrigerant passage functioning as the nozzle.

Next, the driving part 160 that is arranged within the middle body 230 and displaces the passage formation member 151 will be described. The driving part 160 is configured with a circular laminated diaphragm 161. More specifically, as illustrated in FIG. 9, the diaphragm 161 is fixed by means such as welding so as to partition a cylindrical space, provided in a part of the middle body 230 on the radially outer side, into two spaces upper and lower.

The upper space (i.e. a space on a side near to the inflow space 203) of the two spaces partitioned by the diaphragm 161 configures a sealed space 162 in which a temperature sensitive medium is enclosed. A pressure of the temperature sensitive medium changes according to a temperature of the refrigerant flowing out of the evaporator 16. The temperature sensitive medium has the same composition as that of the refrigerant circulating in the refrigeration cycle 10, and the temperature sensitive medium is enclosed to have a predetermined density in the sealed space 162. Therefore, the temperature sensitive medium according to the present embodiment is R134a.

On the other hand, the lower space of the two spaces partitioned by the diaphragm 161 configures an introduction space 163 into which the refrigerant flowing out of the evaporator 16 is introduced through a non-shown communication channel. Therefore, the temperature of the refrigerant flowing out of the evaporator 16 is transmitted to the temperature sensitive medium enclosed in the sealed space 162 via a cap member 164 and the diaphragm 161. The cap member 164 partitions the inflow space 203 and the sealed space 162.

In this example, as apparent from FIGS. 9 and 10, the suction part (suction passage) 120 is arranged on the upper side of the middle body 230 in the present embodiment, and the diffuser passage 130 is arranged on the lower side of the middle body 230. Therefore, at least a part of the driving part 160 is arranged at a position sandwiched by the suction part 120 and the diffuser passage 130 in a vertical direction when viewed from the radial direction of the axial line.

In more detail, the sealed space 162 of the driving part 160 is arranged at a position where the suction part 120 overlaps with the diffuser passage 130 when viewed from the axial direction, and at a position surrounded by the suction part 120 and the diffuser passage 130. With this configuration, the temperature of the refrigerant flowing out of the evaporator 16 is transmitted to the sealed space 162, and an internal pressure within the sealed space 162 becomes a pressure corresponding to the temperature of the refrigerant flowing out of the evaporator 16.

Further, the diaphragm 161 is deformed according to a differential pressure between the internal pressure of the sealed space 162 and the pressure of the refrigerant which has flowed into the introduction space 163 from the evaporator 16. For that reason, it is preferable that the diaphragm 161 is made of a material rich in elasticity, excellent in heat conduction, and tough. For example, it is desirable that the diaphragm 161 is formed of a metal laminate made of stainless steel (SUS304). The diaphragm 161 may be used as an example of the pressure responsive member that is displaced according to the pressure of the temperature sensitive medium within the sealed space 162.

Also, an upper end side of a cylindrical actuating bar 165 joined to a center portion of the diaphragm 161 by means such as welding, and a lower end side of the actuating bar 165 is fixed to a radially-outer and lowermost (bottom) part of the passage formation member 151. With this configuration, the diaphragm 161 and the passage formation member 151 are coupled with each other, and the passage formation member 151 is displaced in accordance with a displacement of the diaphragm 161 to regulate the refrigerant passage area of the nozzle throat portion 113 in the depressurizing space 202.

Specifically, when the temperature (the degree of superheat) of the refrigerant following out of the evaporator 16 rises, a saturated pressure of the temperature sensitive medium enclosed in the sealed space 162 rises to increase a differential pressure obtained by subtracting the pressure of the introduction space 163 from the internal pressure of the sealed space 162. With this configuration, the diaphragm 161 displaces the passage formation member 151 in a direction (lower side in the vertical direction) such that the refrigerant passage area in the nozzle throat portion 113 is enlarged.

On the other hand, when the temperature (the degree of superheat) of the refrigerant flowing out of the evaporator 16 falls, a saturated pressure of the temperature sensitive medium sealed in the sealed space 162 falls to decrease the differential pressure obtained by subtracting the pressure of the introduction space 163 from the internal pressure of the sealed space 162. With this configuration, the diaphragm 161 displaces the passage formation member 151 in a direction (upper side in the vertical direction) such that the refrigerant passage area in the nozzle throat portion 113 is reduced.

As above, the diaphragm 161 displaces the passage formation member 151 according to the degree of superheat of the outflow refrigerant from the evaporator 16. As a result, the refrigerant passage area in the nozzle throat portion 113 can be regulated so that the degree of superheat of the refrigerant on the outlet side of the evaporator 16 approaches a predetermined given value. That is, in the present embodiment, an area variable mechanism 150 is configured by the passage formation member 151 and the driving part 160.

A gap between the actuating bar 165 and the middle body 230 is sealed by a seal member such as an O-ring not shown, and the refrigerant is not leaked through the gap even if the actuating bar 165 is displaced.

The bottom of the passage formation member 151 is subjected to a load of a coil spring 241 fixed to the lower body 240. The coil spring 241 exerts the load urging the passage formation member 151 so as to reduce the refrigerant passage area in the nozzle throat portion 113. With the regulation of this load, a valve opening pressure of the passage formation member 151 can be changed to change a target degree of superheat.

Further, in the present embodiment, the multiple (specifically, two) cylindrical spaces are provided in the part of the middle body 230 on the radially outer side, and the respective circular laminated diaphragms 161 are fixed in those spaces to configure two driving parts 160. However, the number of driving parts 160 is not limited to this number. When multiple driving parts 160 are provided, it is desirable that the driving parts 160 are arranged at regular intervals in angle around the center axis.

Alternatively, a diaphragm formed of the annular thin plate may be fixed in a space having an annular shape when viewed from the axial direction, and the diaphragm and the passage formation member 151 may be coupled with each other by multiple actuating bars.

Next, the lower body 240 is formed of a circular-cylindrical metal member, and fixed in the housing body 210 by means such as screwing so as to close a bottom of the housing body 210. The gas-liquid separation space 206 that separates gas and liquid of the refrigerant that has flowed out of the above-mentioned diffuser passage 130 is provided between the upper side of the lower body 240 and the middle body 230.

The gas-liquid separation space 206 is formed as a space of a substantially cylindrical rotating body shape, and the center axis of the gas-liquid separation space 206 is also arranged coaxially with the center axes of the swirling space 140 and the depressurizing space 202.

As described above, since the refrigerant flows in the diffuser passage 130 along the refrigerant passage annular in cross-section while swirling, the refrigerant that flows from the diffuser passage 130 into the gas-liquid separation space 206 has a velocity component in the swirling direction. Therefore, the gas and liquid of refrigerant are separated by the action of the centrifugal force within the gas-liquid separation space 206.

A cylindrical pipe 242 that is arranged coaxially with the gas-liquid separation space 206 and extends upward is disposed in the center portion of the lower body 240. The liquid-phase refrigerant separated in the gas-liquid separation space 206 is accumulated on a radially outer side of the pipe 242. Also, a gas-phase refrigerant outflow passage 243 is provided inside the pipe 242 and guides the gas-phase refrigerant separated in the gas-liquid separation space 206 to the gas-liquid refrigerant outflow port 214 of the housing body 210.

Further, the above-mentioned coil spring 241 is fixed to an upper end of the pipe 242. The coil spring 241 also functions as a vibration absorbing member that attenuates the vibration of the passage formation member 151, which is caused by a pressure pulsation generated when the refrigerant is depressurized. Additionally, an oil return hole 244 that returns a refrigerant oil in the liquid-phase refrigerant into the compressor 11 through the gas-phase refrigerant outflow passage 243 is formed on a base portion (lowermost portion) of the pipe 242.

The other configurations and operation of the refrigeration cycle are identical with those in the fourth embodiment. Therefore, in the ejector 100 according to the present embodiment, the refrigerant is swirled in the swirling space 140 as in the first embodiment, as a result of which the energy conversion efficiency (corresponding to the nozzle efficiency) in the nozzle passage 110 can be improved, and the ejector efficiency can be also improved.

In more detail, in the convergent portion 111 of the nozzle passage 110, the boiling of the subcooled refrigerant is promoted by a wall surface boiling and an interface boiling. The wall surface boiling is generated when the refrigerant is separated from a radially outer wall surface of the annular refrigerant passage, and the interface boiling is caused by a boil core generated due to cavitation of the refrigerant on the center axis side of the annular refrigerant passage. Accordingly, the refrigerant can be made to be in a gas-liquid mixed state in which the gas phase and the liquid phase are uniformly mixed together.

The flow of the refrigerant in the gas-liquid mixed state is choked in the vicinity of the nozzle throat portion 113. The refrigerant in the gas-liquid mixed state reaches the sonic speed by the choking and is accelerated to be jetted in the divergent portion 112. Accordingly, the refrigerant of the gas-liquid mixed state can be efficiently accelerated to the sonic speed by the boiling promotion caused by both of the wall surface boiling and the interface boiling. As a result, the energy conversion efficiency in the nozzle passage 110 can be improved.

Further, the passage formation member 151 of the ejector 100 according to the present embodiment is formed into the substantially conical shape in which the sectional area increases with distance from the depressurizing space 202. As a result, the diffuser passage 130 can be shaped to expand toward the radially outer side with distance from the depressurizing space 202. Therefore, the enlargement of the dimension of the passage formation member 151 in the axial direction (axial line 114 direction of the nozzle part 110) is limited, and the body of the overall ejector 100 can be prevented from being upsized.

In the ejector 100 according to the present embodiment, the depressurizing space 202, the inflow space 203 and the suction passage 204 which form the suction part 120, the pressurizing space 205, and the passage formation member 151 are each formed into the rotating body shape, and the respective axial lines are arranged coaxially. The nozzle passage 110, the suction part 120 and the diffuser passage 130 are each formed into an annular shape (doughnut shape) in cross-section perpendicular to the axial direction.

With the above configuration, for example, the suction part 120 can be formed into a shape in which the refrigerant flows from the radially outer side of toward the radially inner side with respect to the axial line, and the diffuser passage 130 can be formed into a shape in which the refrigerant flows from the radially inner side toward the radially outer side with respect to the axial line. That is, a passage layout that effectively utilizes the internal space of the body member 200 can be achieved, and upsizing of the body of the overall ejector can be further limited.

Further, the cross-sectional shape of the diffuser passage 130 is formed into the annular shape. Thus, the refrigerant flowing through the diffuser passage 130 can be swirled in the same direction as that of the refrigerant swirled in the swirling space 140.

Figure 14:
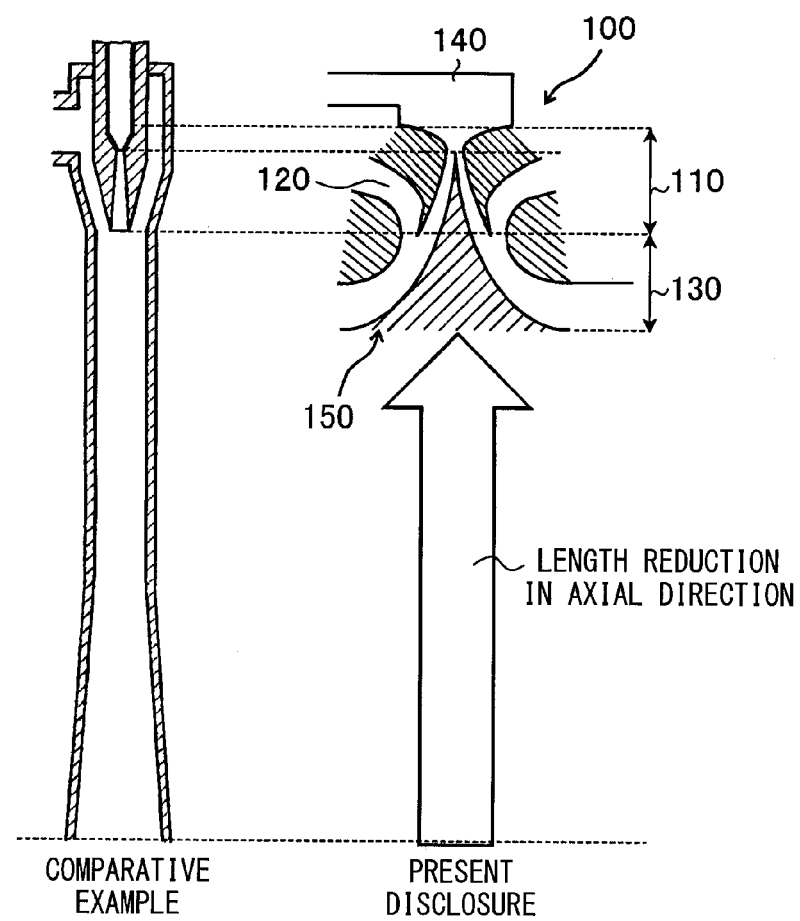
FIG. 14 is a comparative diagram illustrating downsizing effects of the ejector according to the fifth embodiment.

With the above configuration, since the flow channel for pressurizing the refrigerant can be formed into the spiral shape, as illustrated in FIG. 14, enlargement of the dimension of the diffuser part 130 in the center axis direction can be limited as compared with a case in which the diffuser part is shaped to extend in the axial direction of the nozzle part as in a comparative example. As a result, the upsizing of the body of the overall ejector 100 can be further limited.

Since the ejector 100 according to the present embodiment includes the driving part 160 which displaces the passage formation member 151 in accordance with a load variation of the refrigeration cycle 10D, the refrigerant passage areas of the nozzle passage 110 and the diffuser passage 130 can be regulated. Therefore, the amount of refrigerant corresponding to the load of the refrigeration cycle 10D can be made to flow, and the effective operation of the ejector 100 matching the load of the refrigeration cycle 10D can be derived.

Further, since the sealed space 162 in which the temperature sensitive medium is enclosed in the driving part 160 is arranged at the position sandwiched between the suction part 120 and the diffuser passage 130, the space formed between the suction part 120 and the diffuser passage 130 can be effectively utilized. As a result, the body of the overall ejector can be further prevented from being upsized.

Moreover, since the sealed space 162 is arranged at the position surrounded by the suction part 120 and the diffuser passage 130, the temperature of the refrigerant flowing through the suction part 120 from the evaporator 16 is excellently transmitted to the temperature sensitive medium without being affected by an outside air temperature, and the pressure in the sealed space 162 can be changed accordingly. That is, the pressure within the sealed space 162 can be changed with high precision depending on the temperature of the outflow refrigerant from the evaporator 16.

As a result, the refrigerant passage areas of the nozzle passage 110 and the diffuser passage 130 can be more properly changed, and the area variable mechanism 150 can be downsized with a reduction in size of the sealed space 162.

Also, the gas-liquid separation space 206 that separates gas and liquid of the refrigerant that flows out of the diffuser passage 130 is formed in the body member 200 of the ejector 100 according to the present embodiment. Hence, the volume of the gas-liquid separation space 206 can be effectively reduced as compared with a case in which gas-liquid separating means is provided in addition to the ejector 100.

That is, in the gas-liquid separation space 206 according to the present embodiment, since the refrigerant that flows out of the diffuser passage 130 having the annular shape in cross-section has been already swirled, there is no need to provide a space for generating or growing the swirling flow of the refrigerant in the gas-liquid separation space 206. Therefore, the volume of the gas-liquid separation space 206 can be effectively reduced as compared with the case in which a gas-liquid separating device is provided separately from the ejector 100.

As a result, as in the fourth embodiment, the downsized ejector 100 provided integrally with the gas-liquid separator 13 and the liquid storage part 14 can be realized.

(Other Embodiments)

The preferred embodiments of the present disclosure have been described above. However, the present disclosure is not limited to the above-mentioned embodiments, and can be variously deformed without departing from the spirit of the present disclosure.

In the above respective embodiments, the high-pressure refrigerant that flows into the swirling space 140 is the liquid-phase refrigerant. However, the high-pressure refrigerant is not limited to this configuration, but may be a gas-liquid two-phase refrigerant. Even if the refrigerant that flows into the swirling space 140 is the gas-liquid two-phase state, the amount of gas-phase refrigerant on the radially inner side of the swirling center line can be made larger than that on the radially outer side thereof in the swirling space 140 by the swirling flow of the refrigerant, and the same effects in the improvement of the nozzle efficiency are obtained.

Also, in the above respective embodiments, both of the flow channel area of the nozzle part 110 and the flow channel area of the diffuser part 130 are changed by the area variable mechanism 150 at the same time. However, those flow channel areas may not be changed at the same time, but may be changed, independently.

Also, the internal flow channel of the diffuser part 130 is expanded in the direction intersecting with the axial direction of the diffuser part 130 from the upstream side toward the downstream side. However, the internal flow channel of the diffuser part 130 is not limited to this configuration, but may be expanded mainly toward the axial direction.

Also, in the above respective embodiments, as the passage formation member 151 configuring the area variable mechanism 150, the cross-sectional shape taken along the axial direction is not a complete isosceles triangle, but employs a shape in which two sides between which a vertex is sandwiched are convexed on a radially inner side as illustrated in FIGS. 2 and 4. Alternatively, the cross-sectional shape may be a shape in which the two sides are convexed on a radially outer side, a shape close to a cone, or a shape partially having a conical shape.

Also, in the refrigeration cycle 10 according to the first embodiment, the receiver 12b may be provided as in the third embodiment.

Also, the refrigeration cycles 10, 10A, 10B, 10C, and 10D according to the respective embodiments can be applied to a vehicular refrigerator, or a heat pump cycle for domestic water heater or indoor air conditioning instead of the above vehicle air conditioner.

Also, in the above first to fourth embodiments, although the type of refrigerant is not particularly specified, a fluorocarbon refrigerant, an HC refrigerant, or a carbon dioxide refrigerant can be used, and applied to a supercritical cycle and a subcritical cycle in addition to the normal cycle.

Also, in the above fifth embodiment, the driving part 160 that displaces the passage formation member 151 includes the sealed space 162 in which the temperature sensitive medium having the pressure changed according to a change in the temperature is sealed, and the diaphragm 161 that is displaced according to the pressure of the temperature sensitive medium within the sealed space 162. However, the driving part is not limited to this configuration.

For example, a thermowax having a volume changed according to the temperature may be employed as the temperature sensitive medium, or a configuration having an elastic member of a shape memory alloy may be used as the driving part. Further, a configuration in which the passage formation member 151 is displaced by an electric mechanism such as an electric motor or a solenoid may be employed as the driving part.

What is claimed is:

1. An ejector used for a vapor compression refrigeration cycle, comprising:
    a body member including a refrigerant inflow port through which a refrigerant is introduced, a swirling space in which the refrigerant introduced from the refrigerant inflow port swirls, a depressurizing space in which the refrigerant flowing out of the swirling space is depressurized, a suction passage communicating with a downstream side of the depressurizing space in a refrigerant flow and being a passage through which a refrigerant is drawn from an external, and a pressurizing space in which the refrigerant jetted from the depressurizing space and the refrigerant drawn through the suction passage are mixed and pressurized;
    a passage formation member having at least a portion arranged in the depressurizing space and a portion arranged in the pressurizing space;
    a nozzle passage provided in a space between an inner peripheral surface of a portion of the body member which defines the depressurizing space and an outer peripheral surface of the passage formation member, the nozzle passage functioning as a nozzle part that depressurizes and jets the refrigerant flowing out of the swirling space; and
    a diffuser passage provided in a space between an inner peripheral surface of a portion of the body member which defines the pressurizing space and an outer peripheral surface of the passage formation member, the diffuser passage functioning as a diffuser part that mixes the jetted refrigerant with the drawn refrigerant and pressurizes the mixed refrigerant, wherein
    the passage formation member has a shape that increases in cross-sectional area with distance from the depressurizing space.

2. The ejector according to claim 1, wherein
    the passage formation member has a conical shape that increases in cross-sectional area with distance from the depressurizing space, and
    the nozzle passage, the suction passage and the diffuser passage each have an annular shape in cross-section perpendicular to an axial direction of the passage formation member.

3. The ejector according to claim 1, wherein
    the passage formation member has a conical shape that increases in cross-sectional area with distance from the depressurizing space,
    the diffuser passage has an annular shape in cross-section perpendicular to an axial direction of the passage formation member, and
    the refrigerant flowing through the diffuser passage swirls in the same direction as the refrigerant swirling in the swirling space.

4. The ejector according to claim 1, comprising a driving part that displaces the passage formation member, wherein
    the passage formation member has a conical shape that increases in cross-sectional area with distance from the depressurizing space,
    the suction passage and the diffuser passage each have an annular shape in a cross-section perpendicular to an axial direction of the passage formation member,
    the suction passage has a shape in which the refrigerant flows from a radially outer side to a radially inner side with respect to an axis of the passage formation member,
    the diffuser passage has a shape in which the refrigerant flows from the radially inner side to the radially outer side with respect to the axis of the passage formation member,
    the suction passage and the diffuser passage are disposed along an outer periphery of the driving part, and
    at least a part of the driving part is disposed between the suction passage and the diffuser passage in the axial direction of the passage formation member.

5. The ejector according to claim 4, wherein
    the driving part has a sealed space in which a temperature sensitive medium that changes in pressure depending on temperature change is enclosed, and a pressure responsive member that is displaced in accordance with the pressure of the temperature sensitive medium in the sealed space,
    the pressure responsive member is connected to the passage formation member, and
    the temperature sensitive medium changes in pressure by a temperature transmitted from the refrigerant flowing through the suction passage and a temperature transmitted from the refrigerant flowing through the diffuser passage.

6. The ejector according to claim 1, wherein the depressurizing space, the suction passage, the pressurizing space and the passage formation member are each formed into a rotating body shape, and respective axial lines thereof are arranged coaxially with each other.

7. The ejector according to claim 1, wherein the body member has a gas-liquid separation space in which the refrigerant flowing out of the diffuser passage is separated into gas and liquid.

8. An ejector used for a vapor compression refrigeration cycle, comprising:
    a nozzle part that depressurizes and expands a high-pressure refrigerant that flows from a high pressure side of the refrigeration cycle;
    a suction part that draws a low-pressure refrigerant lower in pressure than the high-pressure refrigerant by a suction force of the refrigerant jetted from the nozzle part;
    a diffuser part disposed on a downstream side of the nozzle part, the diffuser part having an internal flow channel in which a sectional area gradually increases toward the downstream side, the diffuser part decelerating and pressurizing a mixed refrigerant of the refrigerant jetted from the nozzle part and the low-pressure refrigerant drawn from the suction part;

a swirling space arranged on an upstream side of the nozzle part, the swirling space allowing the high-pressure refrigerant to swirl therein so as to make an amount of gas-phase refrigerant larger on a radially inner side than on a radially outer side with respect to an imaginary swirling center line, and allowing the refrigerant in a gas-liquid multiphase state to flow into the nozzle part; and an area variable mechanism capable of changing flow channel areas of the nozzle part and the diffuser part.

9. The ejector according to claim 8, wherein the high-pressure refrigerant is a liquid-phase refrigerant.

10. The ejector according to claim 8, wherein the area variable mechanism is capable of changing the flow channel areas of the nozzle part and the diffuser part simultaneously.

11. The ejector according to claim 8, wherein an increasing rate of a cross-sectional area of the internal flow cannel of the diffuser part is set to be gradually larger toward the downstream side, the area variable mechanism includes a passage formation member having a curved surface along inner peripheral surfaces of the nozzle part and the diffuser part, and the internal flow channel of the diffuser part is disposed along an outer peripheral surface of the passage formation member and expands in a direction intersecting with an axial direction of the diffuser part.

12. The ejector according to claim 8, comprising a gas-liquid separator separating the mixed refrigerant flowing out of the diffuser part into gas and liquid.

13. The ejector according to claim 12, comprising a liquid storage part that accumulates the refrigerant separated into gas and liquid by the gas-liquid separator therein, wherein the liquid storage part is formed integrally with the gas-liquid separator.

* * * * *